United States Patent
Skodinis et al.

(10) Patent No.: US 11,882,001 B2
(45) Date of Patent: Jan. 23, 2024

(54) EFFICIENT NETWORK UPDATES

(71) Applicant: SAP SE, Walldorf (DE)

(72) Inventors: Konstantin Skodinis, Heidelberg (DE); Holger Huene, Heidelberg (DE); Thomas Gross-Boelting, Walldorf (DE); Michael Mueller, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/835,332

(22) Filed: Jun. 8, 2022

(65) Prior Publication Data
US 2023/0403199 A1    Dec. 14, 2023

(51) Int. Cl.
*H04L 41/12* (2022.01)
*H04L 43/106* (2022.01)
*H04L 41/082* (2022.01)

(52) U.S. Cl.
CPC ............ *H04L 41/12* (2013.01); *H04L 41/082* (2013.01); *H04L 43/106* (2013.01)

(58) Field of Classification Search
CPC ...... H04L 41/12; H04L 41/082; H04L 43/106
See application file for complete search history.

(56) References Cited

U.S. PATENT DOCUMENTS

| | | | | |
|---|---|---|---|---|
| 5,848,243 A | * | 12/1998 | Kulkarni | H04L 41/22 709/224 |
| 2014/0074888 A1 | * | 3/2014 | Potter | G06F 16/2423 707/779 |
| 2019/0286510 A1 | * | 9/2019 | Johnston | G06F 11/0751 |

* cited by examiner

*Primary Examiner* — John A Follansbee
*Assistant Examiner* — Fadi Haj Said
(74) *Attorney, Agent, or Firm* — Klarquist Sparkman, LLP

(57) ABSTRACT

Techniques and solutions are provided for determining changes to networks formed from network objects. Changes to network objects, such as addition or deletion operations are received and associated with timestamps. Last data changes for respective network objects are determined, including a last data change for a particular type associated with a respective networked object, where a networked object may be concurrently associated with a plurality of types. A first network object is removed from a first network, and contributions of the first network object to edges in the first network are removed. A second network object is associated with an addition operation and at least one edge is determined that connects the second network object and a third network object. Sets of disconnected network objects are determined. Network objects are associated with an identifier identifying a network that includes a respective network object.

20 Claims, 22 Drawing Sheets

EFFICIENT NETWORK UPDATES

FIELD

The present disclosure generally relates to determining relationships between networked elements. Particular implementations relate to techniques that can be used to identify disconnected networks from a set of network elements when a network element is added to, or removed from, the set.

BACKGROUND

Many processes include routing resources between locations where the resources are maintained, processed, used, or delivered. As an example, a computing process may need to obtain data from a variety of computing systems or devices, where the systems or devices may be connected using a computing network. Similarly, processing may be carried out at various computing systems and devices. Communication channels and other resources used to convey resources, such as data, may have limited capacity.

Similar issues arise in manufacturing. A final output, such as a vehicle, may be produced from many intermediate components, which in turn are produced from other intermediate components or from base resources. Base resources and intermediate components may be processed at different processing resources (e.g., particular machines or work centers) or locations (e.g., plants or factories), and may involve many operations before being delivered to a destination outside of a particular scope (e.g., being delivered to a customer or distributor).

Routing (or planning) processes can be very complex—consider the large number of components used in vehicle manufacturing. Additional complications can arise, including because some resources, whether data, physical materials, processing resources, communication resources, or transportation resources can be used by multiple processes. For instance, multiple vehicles may share common components, such as complex parts such as engines to more granular components such as sensors or bolts.

Determining how various elements in a planning process should be arranged can be very complicated. Further, it is common for new planning processes to be added, or existing planning processes deleted, or modified. Given that changes to network elements, and their interconnection, can result in networks being joined or split, typically it has been necessary to redetermine connected networks after processing a set of changes. Since changes can occur quite frequently, the effort in determining connected network elements may need to be repeated frequently. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for determining changes to networks formed from network objects. Changes to network objects, such as addition or deletion operations are received and associated with timestamps. Last data changes for respective network objects are determined, including a last data change for a particular type associated with a respective networked object, where a networked object may be concurrently associated with a plurality of types. A first network object is removed from a first network, and contributions of the first network object to edges in the first network are removed. A second network object is associated with an addition operation and at least one edge is determined that connects the second network object and a third network object. Sets of disconnected network objects are determined. Network objects are associated with an identifier identifying a network that includes a respective network object.

In one aspect, the present disclosure provides a process for updating network definitions for a plurality of data objects based on changes to the data objects, including deleting a type associated with a data object.

A plurality of data changes to one or more data objects of a plurality of data object types are received. Timestamps are assigned to respective data changes. Data changes, respective data object types, respective timestamps, and a respective indicator of a type of data change are stored in a data structure.

An update process is initiated to update an assignment of a plurality of data objects to a plurality of networks, networks of the plurality of networks being disconnected from one another. For respective data objects, a last data change is determined based on the timestamps. For a first data object, it is determined that a last data change is a deletion operation. A first network that includes the first data object is identified. The first data object is removed from the first network. For at least one edge in the first network connecting the first data object to a second data object of the network, contributions of the first data object to the at least one edge are removed.

It is determined that a last data change for a third data object is an addition operation. At least one edge is added between the third data object and at least a fourth data object, or at least a fifth data object is added to the plurality of data objects. Sets of disconnected data objects are determined. Data objects are associated with respective identifiers identifying a network that includes respective data object.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

Figure 1:
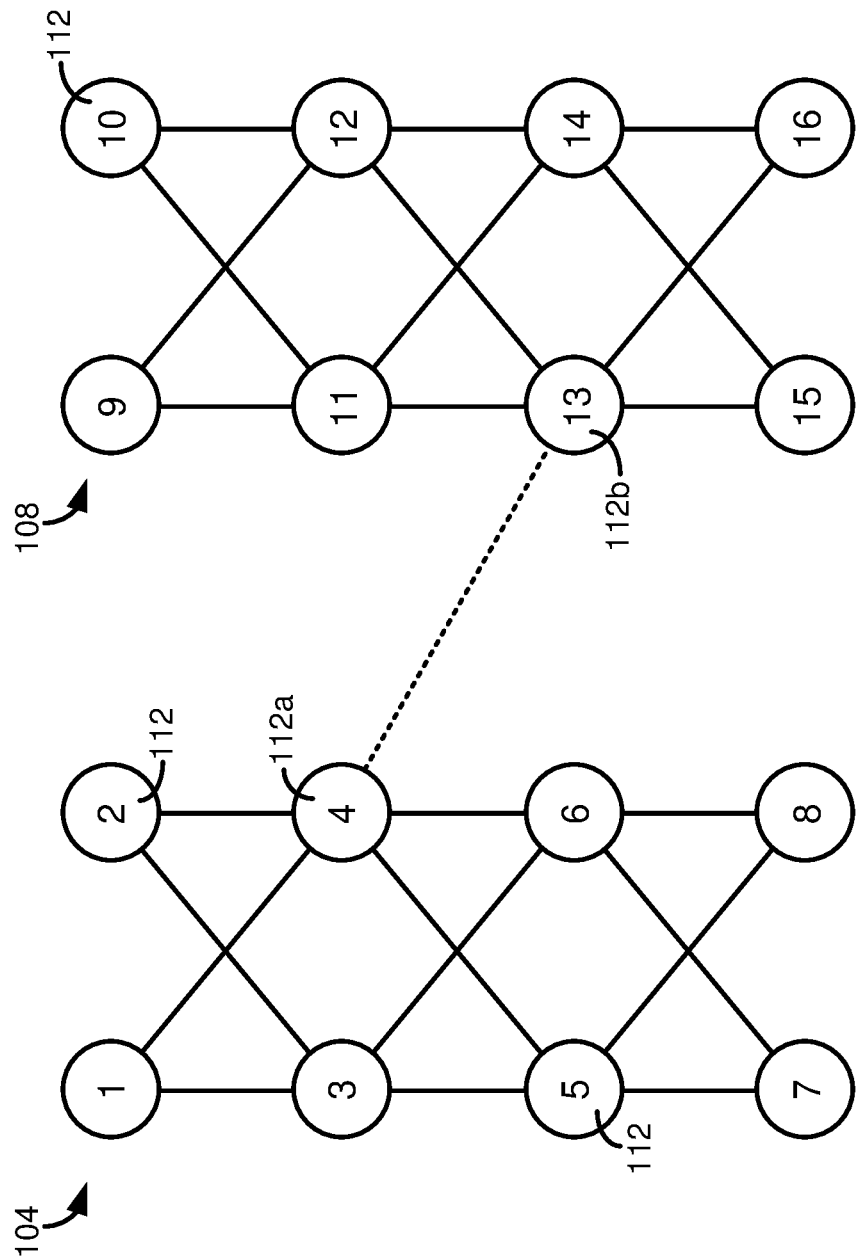
FIG. 1 is a diagram illustrating networked elements, or nodes, and how a set of networked elements may be arranged in multiple, disconnected graphs, or can be connected such that they form a single, connected graph.

Many processes include routing resources between locations where the resources are maintained, processed, used, or delivered. As an example, a computing process may need to obtain data from a variety of computing systems or devices, where the systems or devices may be connected using a computing network. Similarly, processing may be carried out at various computing systems and devices. Communication channels and other resources used to convey resources, such as data, may have limited capacity.

Similar issues arise in manufacturing. A final output, such as a vehicle, may be produced from many intermediate components, which in turn are produced from other intermediate components or from base resources. Base resources and intermediate components may be processed at different processing resources (e.g., particular machines or work centers) or locations (e.g., plants or factories), and may involve many operations before being delivered to a destination outside of a particular scope (e.g., being delivered to a customer or distributor).

Routing (or planning) processes can be very complex—consider the large number of components used in vehicle manufacturing. Additional complications can arise, including because some resources, whether data, physical materials, processing resources, communication resources, or transportation resources can be used by multiple processes. For instance, multiple vehicles may share common components, such as complex parts such as engines to more granular components such as sensors or bolts.

Determining how various elements, such as inputs to/used in a process, or operations performed on such inputs (where the "elements" can be nodes or edges in a network that represents the inputs/operations), in a planning process should be arranged can be very complicated. Further, it is common for new planning processes to be added, or existing planning processes deleted, or modified. Given that changes to network elements, and their interconnection, can result in networks being joined or split, typically it has been necessary to redetermine connected networks after processing a set of changes. Since changes can occur quite frequently, the effort in determining connected network elements may need to be repeated frequently. Accordingly, room for improvement exists.

The present disclosure provides techniques that can be used to analyze data representable in a graph, either in a graph data structure or another suitable computer implemented format for storing and analyzing data for nodes (or vertices) and edges connecting at least a portion of the nodes. The graph can also be referred to as a network.

The nodes are also referred to in the present disclosure as "data objects." As used herein, a "data object" refers to a collection of values for a plurality of attributes that are common between different instances of a data object (that is, multiple data objects can include the same attributes, but have different values for the attributes, and are identified in a way such that one data object can be distinguished from another data object). The data objects can, but need not be, distinct instances of a data structure or a data type, including being instances of an abstract or composite data type (for example, being instances of a particular class). That is, for example, the data objects can be of a "node" abstract data type that is configured to be used in graph operations. However, data objects can also be a set of related values that are stored in some other way, including where data for multiple "data objects" can be stored together. In a specific example, data objects can correspond to particular rows of a relational database table, or a collection of rows having a common identifier (where the common identifier is used to group values that correspond to the data object for the common identifier). The present disclosure provides a particular implementation where the data objects contain data from a relational database, such master data. The is, the data objects can be represented as tables, or rows in a table, but the data in such tables may itself be obtained from other tables or views.

Nodes/"data objects" can be of different types, where a "type" can refer to, for example, two nodes (or data objects) being implemented in two different abstract data types. Or, a single abstract data type can include a data element (for example, an attribute, variable) that specifies a type for a given instance of a more generic type. In general, a "type" refers to a particular category, classification, or description of a feature or features that different subsets of a collection of nodes have in common. In a particular example, a table can include entries for data objects for a type represented by the table. Or, a table can include entries for multiple types of data objects, and an attribute of the table can identify a data object type for a given row of the table. As will be further explained, types can be used when analyzing changes to a network (such as represented by a graph, or which can be processed in an analogous manner as a graph) including a plurality of node types.

More particularly, the technique allows the determination of connected nodes to be carried out by only analyzing changes to a graph structure, such as the addition or deletion of nodes or edges. Modifications of graph components can also be analyzed, where a modification can be represented as a deletion of a prior version of a node or edge followed by an addition of an updated version of the node or edge.

Determining connected nodes in a set of nodes can have a variety of technical benefits. If only connected nodes need be analyzed, analyses using the graph can be simplified, as less data need be loaded and analyzed. Disconnected graphs (particular sets of nodes and edges that are not connected to nodes of another set of nodes in a larger overall set of nodes) that are known to be independent can be processed in parallel, which can speed graph analysis.

In many cases, data may be analyzable/modifiable by a single process at a time. For instance, when data associated with a graph is stored in a database, tables, portions of tables (including columns, rows, or particular partitions of rows and/or columns), or other groupings of data (such as a database schema) may be locked during use. Whether, and how, data might be available to other processes can depend on the nature of the lock and a type of access desired by another process. In at least some cases, when one process wants to modify (i.e., perform one or more write, update, or delete operations) a collection of database elements, that collection is locked (with a write lock) to prevent write operations by other processes. In some cases, at least some types of read requests by other processes may be denied while a lock is held. In other cases, some types of locks, such read locks, held by a first process may be consistent with read requests by other processes, but the read lock may block later received write requests.

The present disclosure, by quickly allowing connected nodes to be determined, can reduce the extent of locking required. As an example, if all data in a database schema was considered to be connected, then only a single process at a time might be able to perform at least some types of operations, such as write operations, on the data. This may be undesirable, particularly if modifications might be desired by numerous users/processes or if the lock might be required for a substantial period of time—which can be the case for complex planning processes. If connected graph nodes can be quickly determined, nodes that are in disconnected graphs can be treated separately for locking purposes (while can also correspond to parallelization or analysis units), more granular locking can be implemented, and concurrent use of an overall data set can be increased.

Disclosed techniques can find particular use in routing or planning operations, whether in routing or planning data processing/transfer operations or in supply chain planning. In particular, detailed examples are provided for a supply chain planning scenario where materials are stored/used at various physical locations and transportation resources are used to transfer materials between locations. However, the innovative graph analysis techniques can find use in any computer implemented graph analysis process.

Example 2—Example Disconnected and Connected Networks

FIG. 1 illustrates a plurality of nodes 112 (including nodes 112*a* and 112*b*) arranged in a graph 104 and a graph 108. The solid lines (edges) represent the graphs 104, 108 in a first state where the graphs are disconnected, while the dashed line (edge) represents a second state where the graphs are connected through nodes 112*a*, 112*b*.

The graphs 104, 108 can represent scenarios where materials are obtained from a supplier (top nodes 112) transported by the edges (where the edges can represent transportation resources, such as trucks, trains, or planes, for physical components, or communication connections for a computing resource planning example) to plants (next lower-level nodes) for processing. From the processing nodes 112, end products resulting from the processing can be transported to warehouses represented by the next to lowest level nodes, and transported eventually to customers, representing by the lowest level nodes, where these transportation processes are also associated with transportation resources.

As an initial matter, it should be appreciated that the graphs 104, 108 represent extremely simple examples for purposes of explaining innovative techniques of the present disclosure. In practice, such as in the example of vehicle production, an output may have thousands of components from hundreds of suppliers, and there may be multiple processing locations at different levels of the hierarchy of nodes. For instance, for a vehicle, some components of a car, such as an engine and a drivetrain, may be produced in Germany using components from a number of suppliers located across the globe. These components may be then shipped to a factory in the United States, combined with hundreds of other components from manufacturing centers/suppliers from across the globe, into cars that are transported to dealerships across the country to be eventually delivered to customers.

Now consider a situation where the graph 104 represents the car production scenario just described, with the graph 108 representing production of a different product, such as a lawnmower, snowblower, or ATV. When the dashed edge is not considered, the graphs 104, 108 are disconnected and independent. So, separate planning scenarios or modifications can be concurrently conducted on the graphs 104, 108.

However, the dashed edge can represent a scenario where a component, such as a sparkplug, used in the car is also used in the lawnmower etc. The dashed edge results in the graphs 104, 108 being connected, and interdependent. In this case, at least certain nodes 112 in the graph 104 influence nodes in the graph 108. Continuing the example of a spark plug, if a spark plug is designated for use in a car, the remaining quantity of the spark plug is reduced for use in a lawnmower. Or, deletion of the node 112 representing the spark plug might be acceptable if that component was no longer needed for the lawnmower (say because an electric engine is used instead of a gas engine), but it may be unacceptable for the production process for the car where the spark plugs are still needed.

Figure 2:
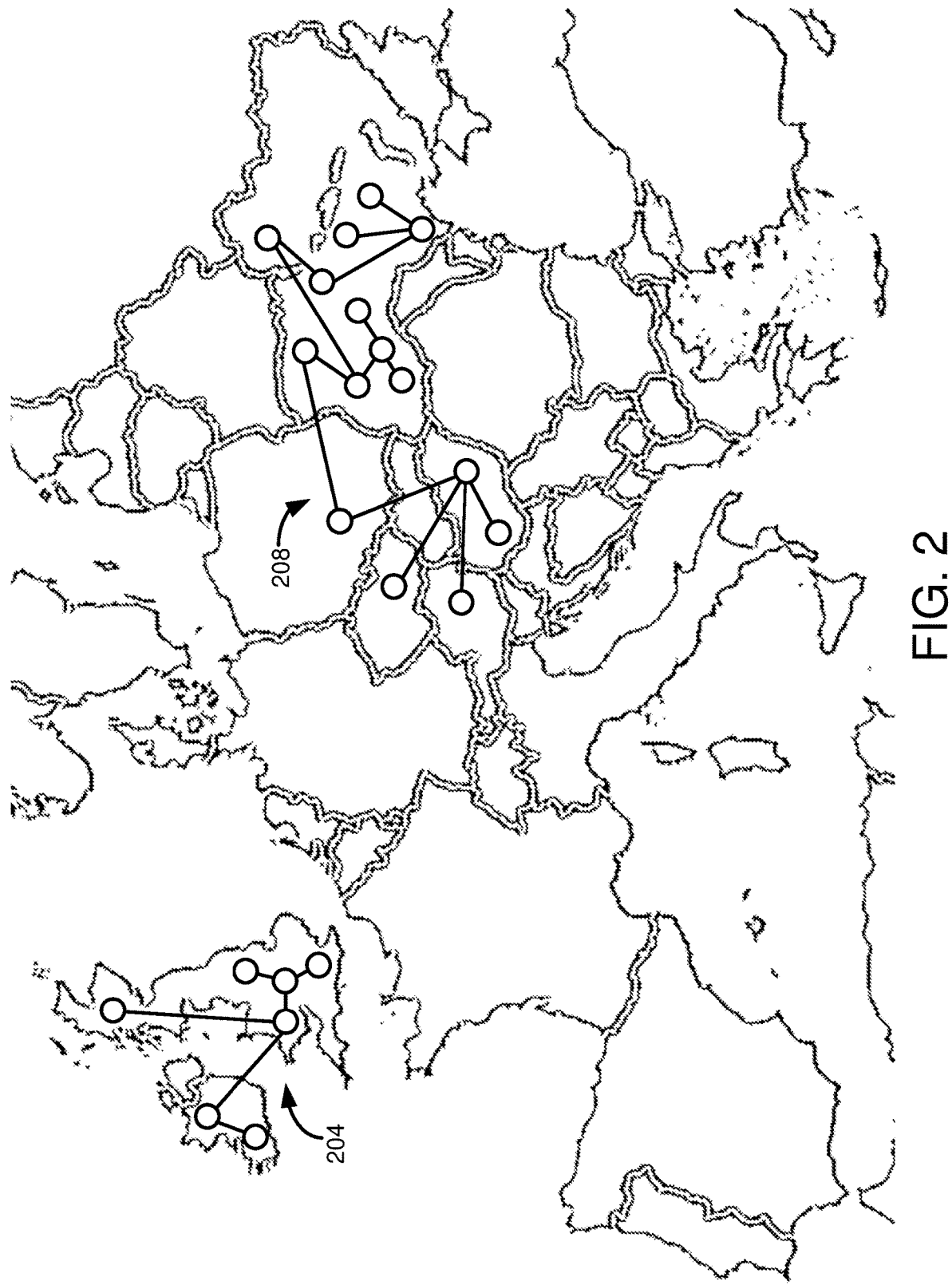
FIG. 2 is a diagram illustrating connected network elements, in a similar manner as FIG. 1, but further illustrating how networked elements may be in different, disconnected graphs where the different graphs are associated with different geographic regions.

FIG. 2 illustrates another scenario in which graphs are independent, or disconnected. Consider a scenario where a product is manufactured and used in different geographic areas, such as a graph 204 representing manufacture and distribution in the UK and Ireland and a graph 208 representing manufacture and distribution in Europe. The graphs 204, 208 can represent the same production process, although a number of each type of node 212 (analogous to the nodes 112) may differ (e.g., more suppliers may be used for Europe than for the UK). It can be seen that the graphs 204 208 are independent, and so use or modification of the graph 204 for the UK can be carried out without locking the graph 208, an analysis of the graph 204 can avoid loading or analyzing data associated with the graph 208, or the graphs 204 and 208 can be analyzed in parallel.

A final note on the graphs 104, 108, 204, 208 is that, while it is visually obvious from the figures whether the graphs are connected or not, these relationships are not immediately apparent from the underlying data. That is, the relationships between a set of nodes typically must be analyzed using a set of edge information before it can be determined whether any two nodes are in the same graph or are in disconnected graphs. If a database, for instance, simply contains tables of materials and locations, it may not be clear whether any processes share common materials at common locations, particularly if there are entries for thousands of materials.

Even if such a graph is available, analyzing the effect of a change in the nodes or edges of a graph may be complex.

Example 3—Example Network Discovery Technique

Disclosed technologies related to analyzing the effect of changes to a graph, such as the addition or deletion of nodes or edges, on node connectedness, including whether the deletion of a node or edge causes a single graph to be split into multiple disconnected graphs, or whether an addition of a node or an edge causes previously disconnected graphs to become connected. These disclosed techniques generally assume that edge and node information has been analyzed to classify the nodes into one or more graphs, where if there are multiple graphs, the graphs are disconnected. Any suitable technique can be used to analyze nodes and edges to find connected nodes, but the "union and fine" technique will be specifically described, in conjunction with FIGS. 3A-3K.

Figure 3A:
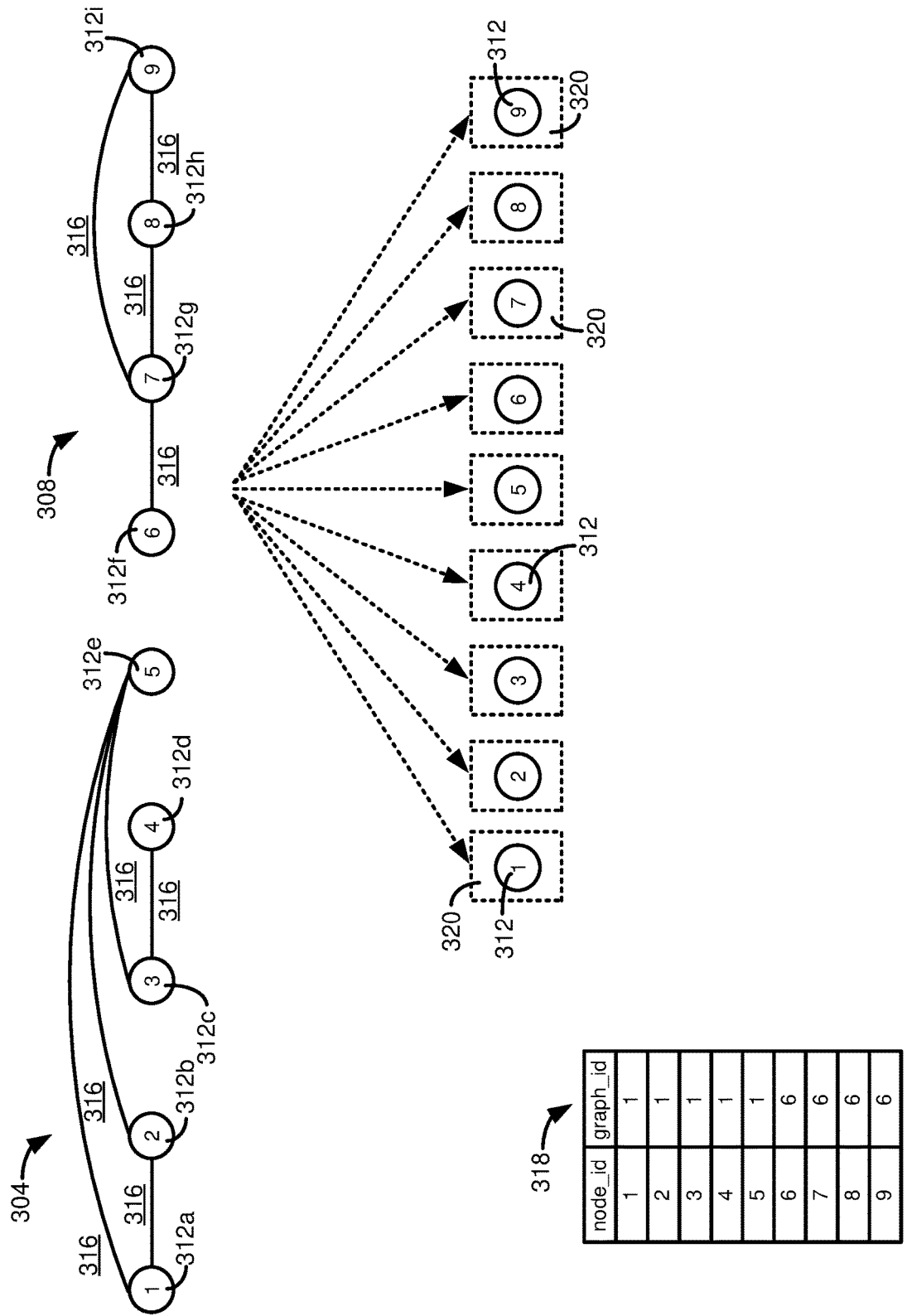
FIGS. 3A-3K illustrate steps taken in a network discovery process.

FIG. 3A illustrates a plurality of nodes 312 (shown as nodes 312a-312i) organized into disconnected graphs 304 and 308. However, at the beginning of the process, it is not known which nodes 312 are connected, or that the nodes are arranged in two disconnected graphs 304, 308. Rather, information available for analysis may include a list of the nodes 312 and a list of edges 316 (shown as edges 316a-316i in FIGS. 3B-3J) connecting the nodes. The eventual output of the find and merge process is shown in a table 318, which lists identifiers for the nodes 312 (nodes 1-9, corresponding to nodes 312a-312i) and identifiers indicating to which graph (graph 304 or graph 308, represented as graph "1" and graph "6," respectively) a given node belongs. Since the graphs are disconnected, a given node 312 will belong to only one of graphs 304, 308.

At a first stage of the process, each of the nodes 312 is assigned to a separate packet 320 (which will later be referred to as packets 320a-320i), where a packet is a grouping of one or more connected nodes. Initially, nodes 312 are not known to be connected, and so each node is assigned to its own packet 320. As nodes 312 are indicated as connected by edges 316, the connected nodes will be merged into a common packet. At the end of the analysis, the remaining packets correspond to identified disconnected graphs.

Figure 3B:
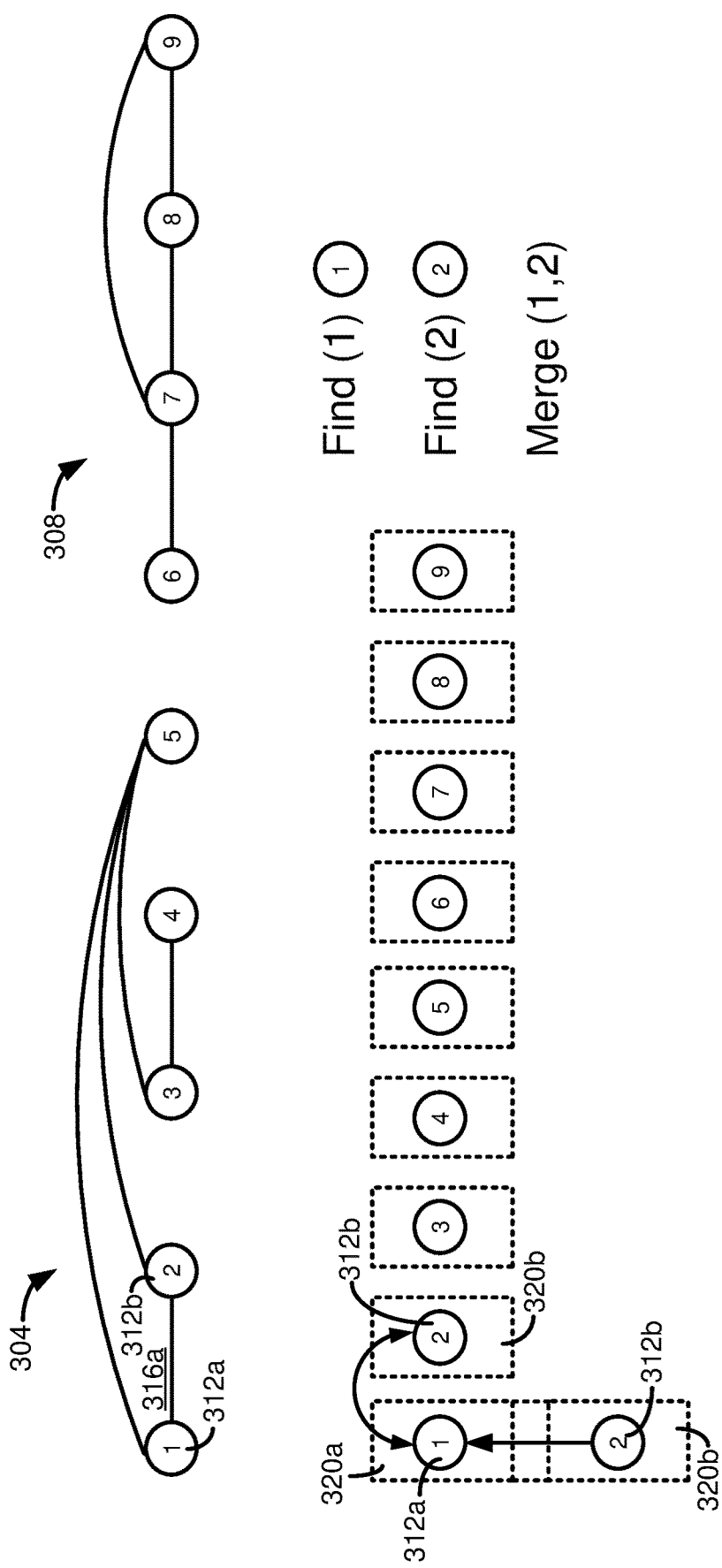
Figure 3C:
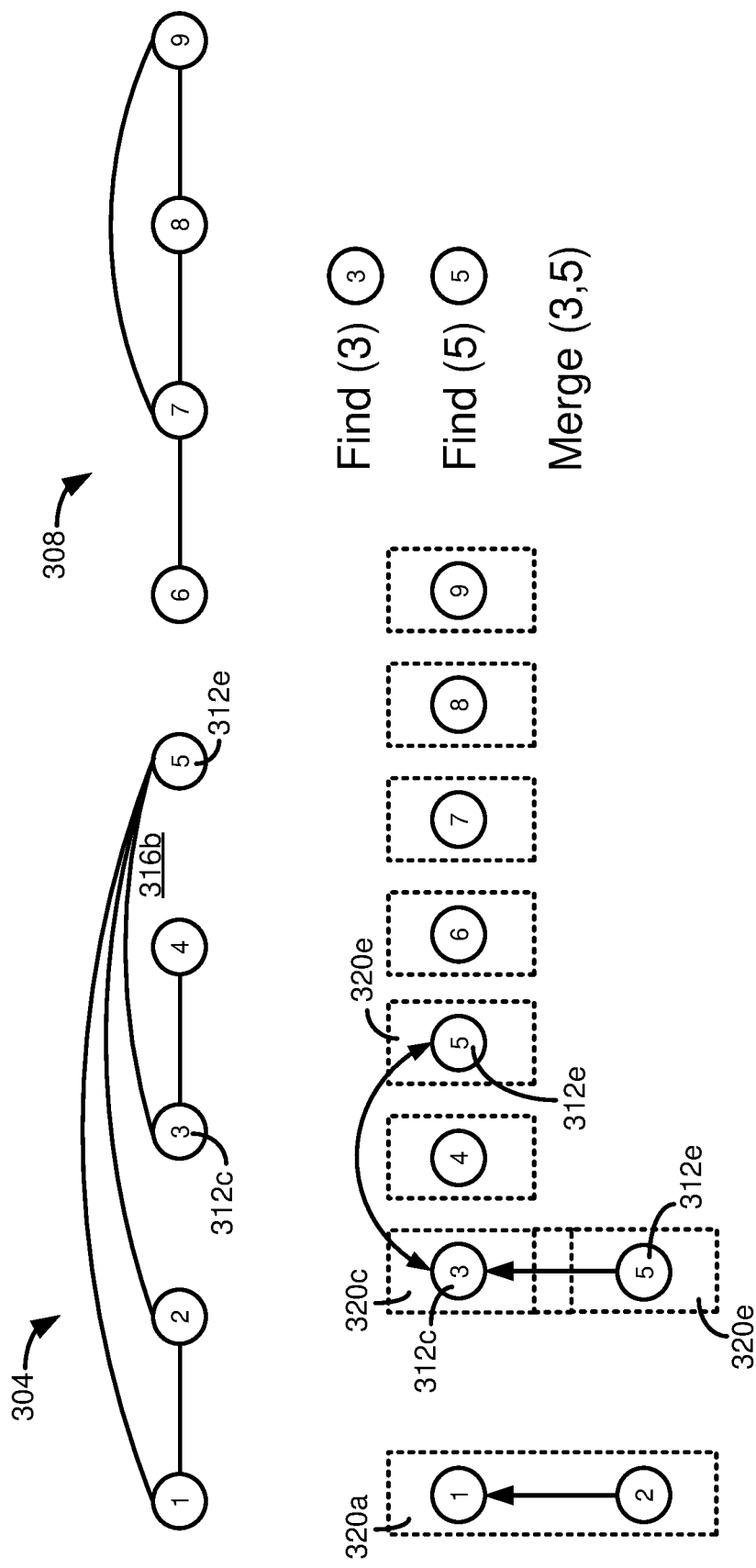

As shown in FIG. 3B, the process starts at node 312a and finds that edge 316a connects the node with node 312b. Node 312a and node 312b are in different packets, 320a, 320b, respectively. Since nodes 312a, 312b are connected and in different packets 320a, 320b, packet 320b and node 312b are merged into packet 320a, as shown in FIG. 3C.

Figure 3D:
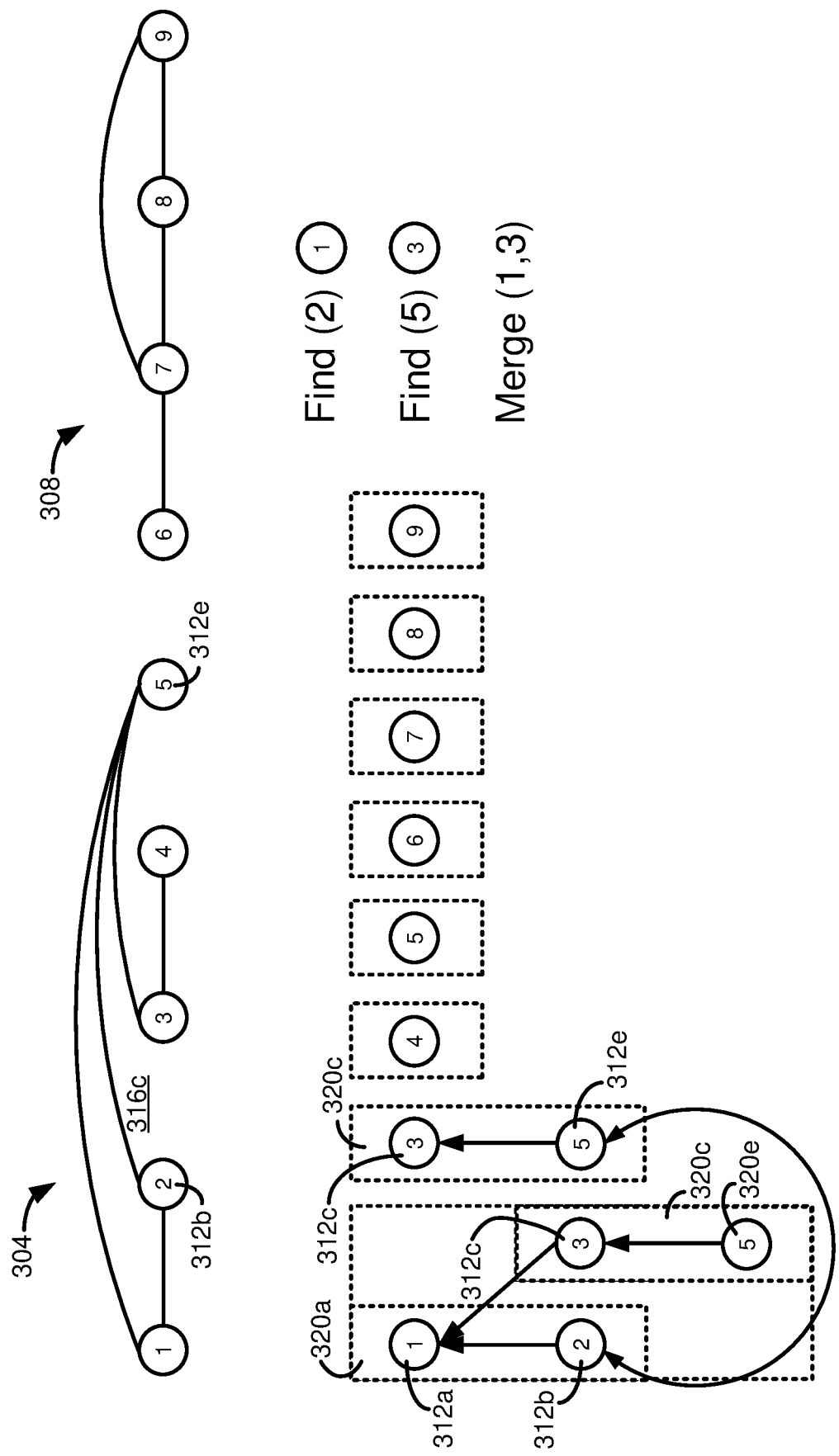

The process continues with node 312c, which is identified as having an edge 316b connecting it with node 312e, and that node 312e is in packet 320e. Since nodes 312c, 312e are connected and in different packets 320c, 320e, packet 320e, and node 312e, are merged into packet 320c, as shown in FIG. 3D.

Assume that node 312b is analyzed and identified as having an edge 316c connecting it with node 312e. Since nodes 312b and 312e are connected, and are associated with different packets 320a, 320c, packet 320c, including both nodes 312c and 312e, is merged into packet 320a, as shown in FIG. 3E, which now contains nodes 312a, 312b, 312c, and 312e.

Figure 3E:
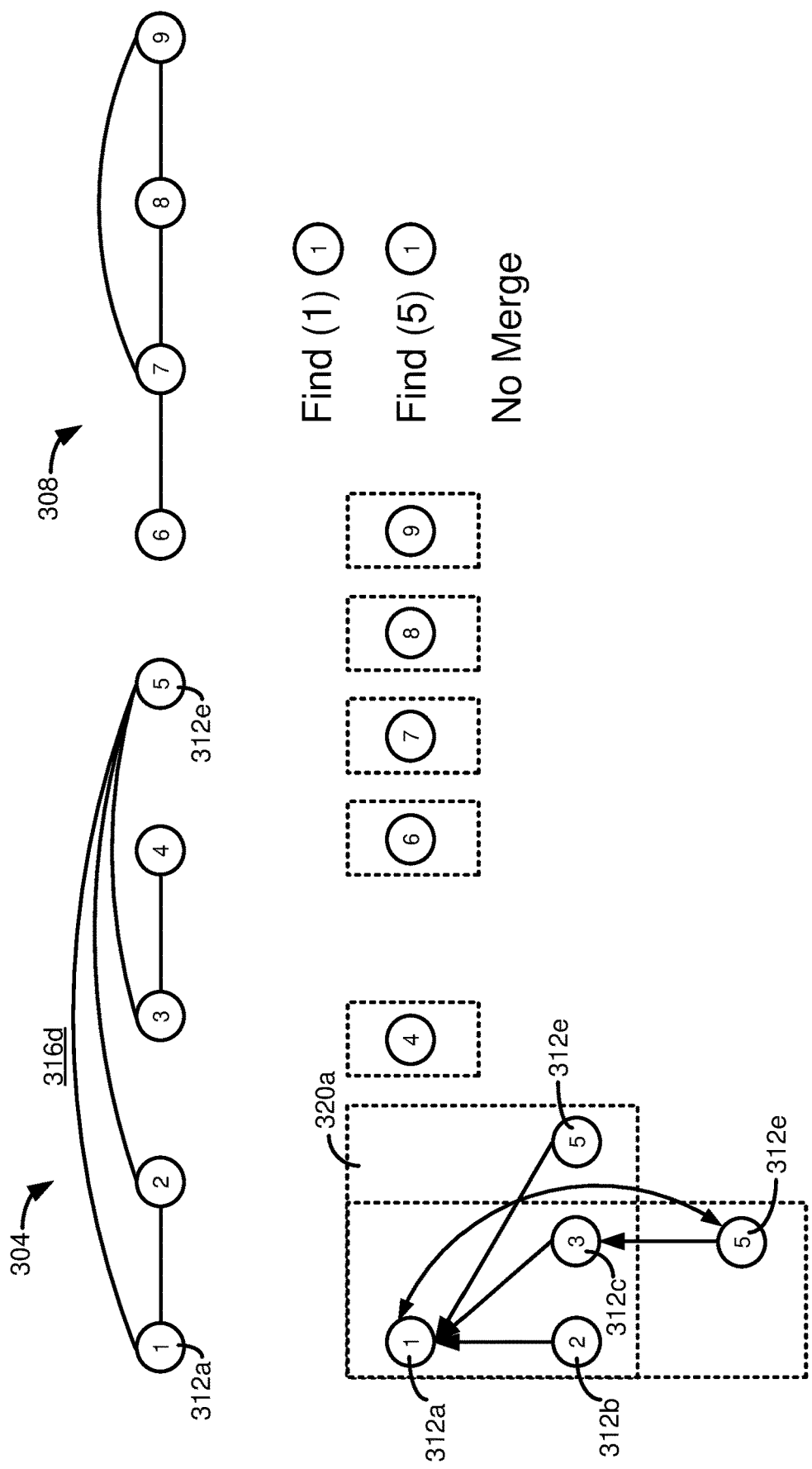

With continued reference to FIG. 3E, an edge 316d between node 312a and node 312e is considered. It is determined that both nodes 312a and 312e are located in packet 320a, and so no merge operation is applied, and the analysis continues to the next edge.

Figure 3F:
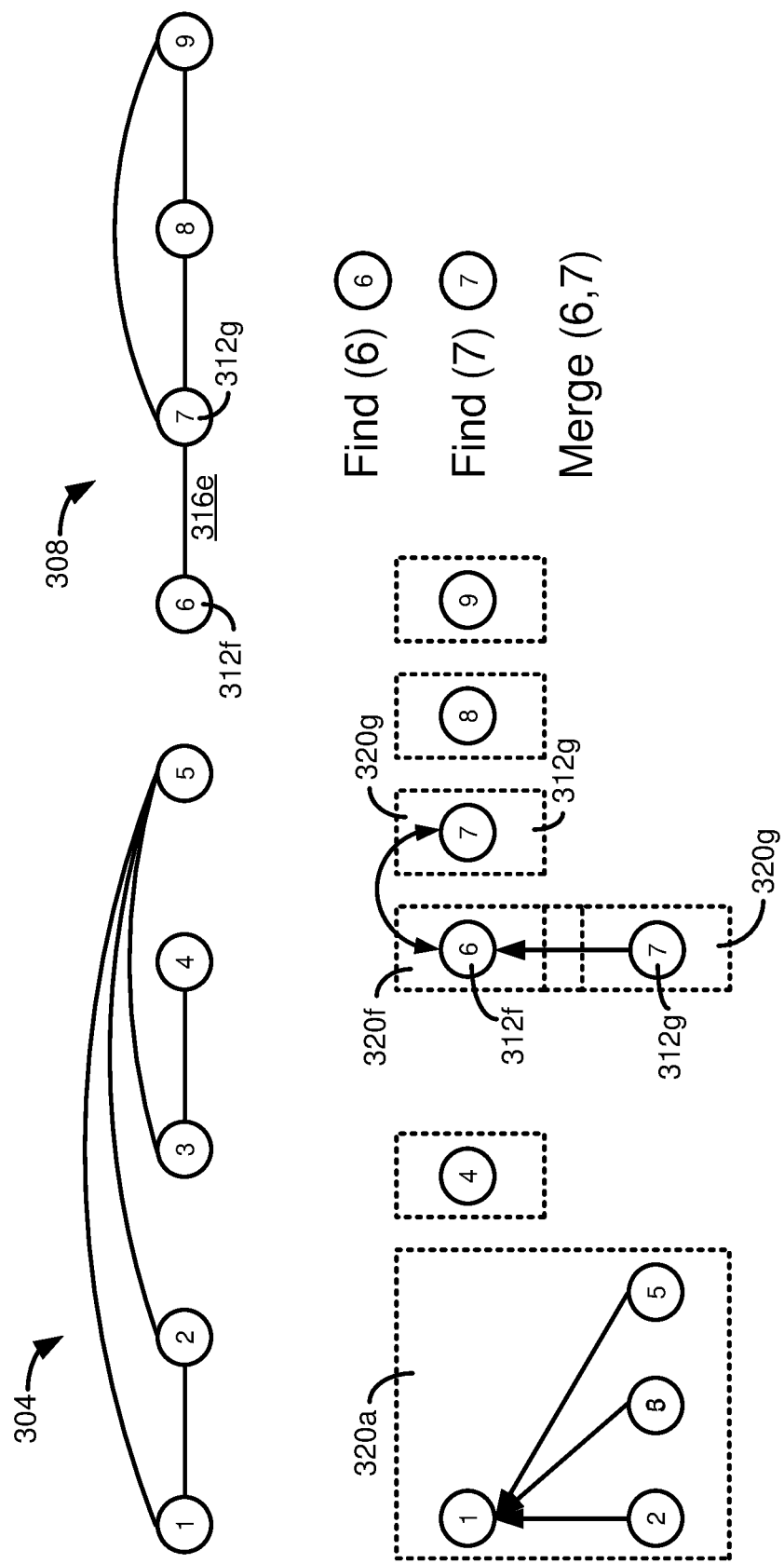
Figure 3G:
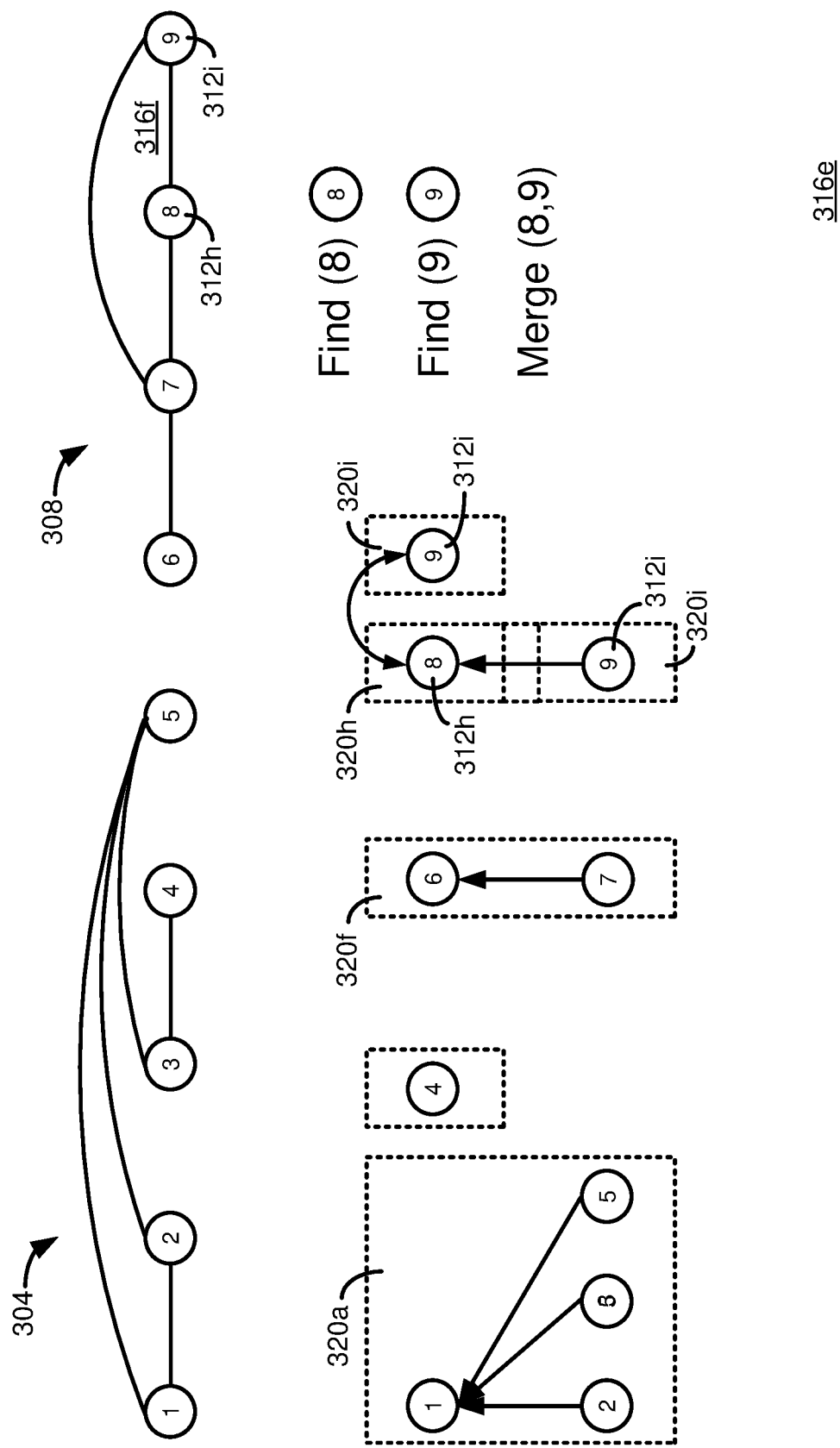

Turning to FIG. 3F, an edge 316e is considered that connects node 312f and node 312g. It is determined that the nodes 312f, 312g are in different packets, 320f, 320g, respectively. Since the nodes 312f, 312g are in different packets, packet 320g and its node 312g are merged into packet 320e, as shown in FIG. 3G.

Figure 3H:
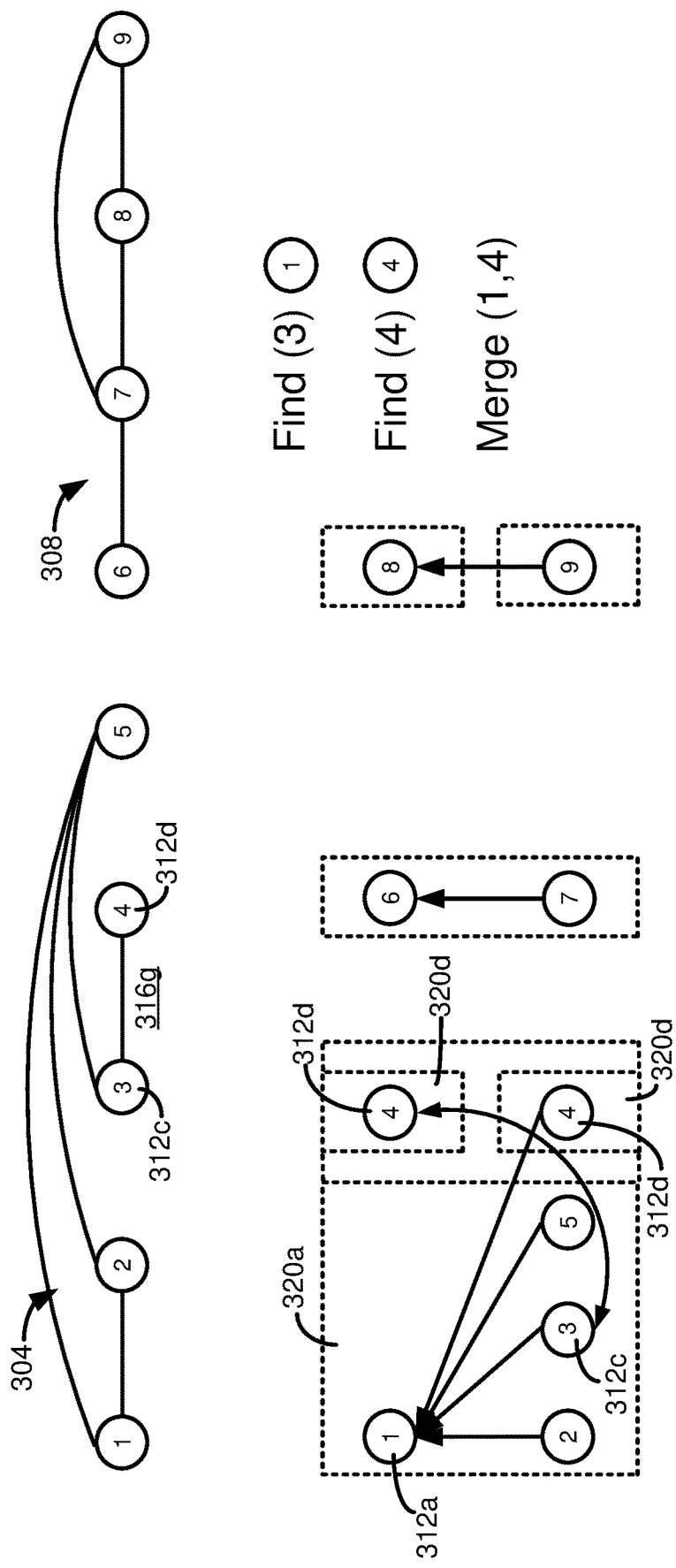

Continuing the find and merge procedure, an edge 316f is considered that connects node 312h with node 312i, which are contained within respective packets 320h, 320i. Since the nodes 312h, 312i are in different packets, packet 320i and node 312i are merged into packet 320h, as shown in FIG. 3H.

Next, an edge 316g is considered that connects node 312c and node 312d. Since the nodes 312c, 312d are in different packets 320a, 320d, respectively, packet 320d and node 312d are merged into packet 320a, as shown in FIG. 3I.

Figure 3I:
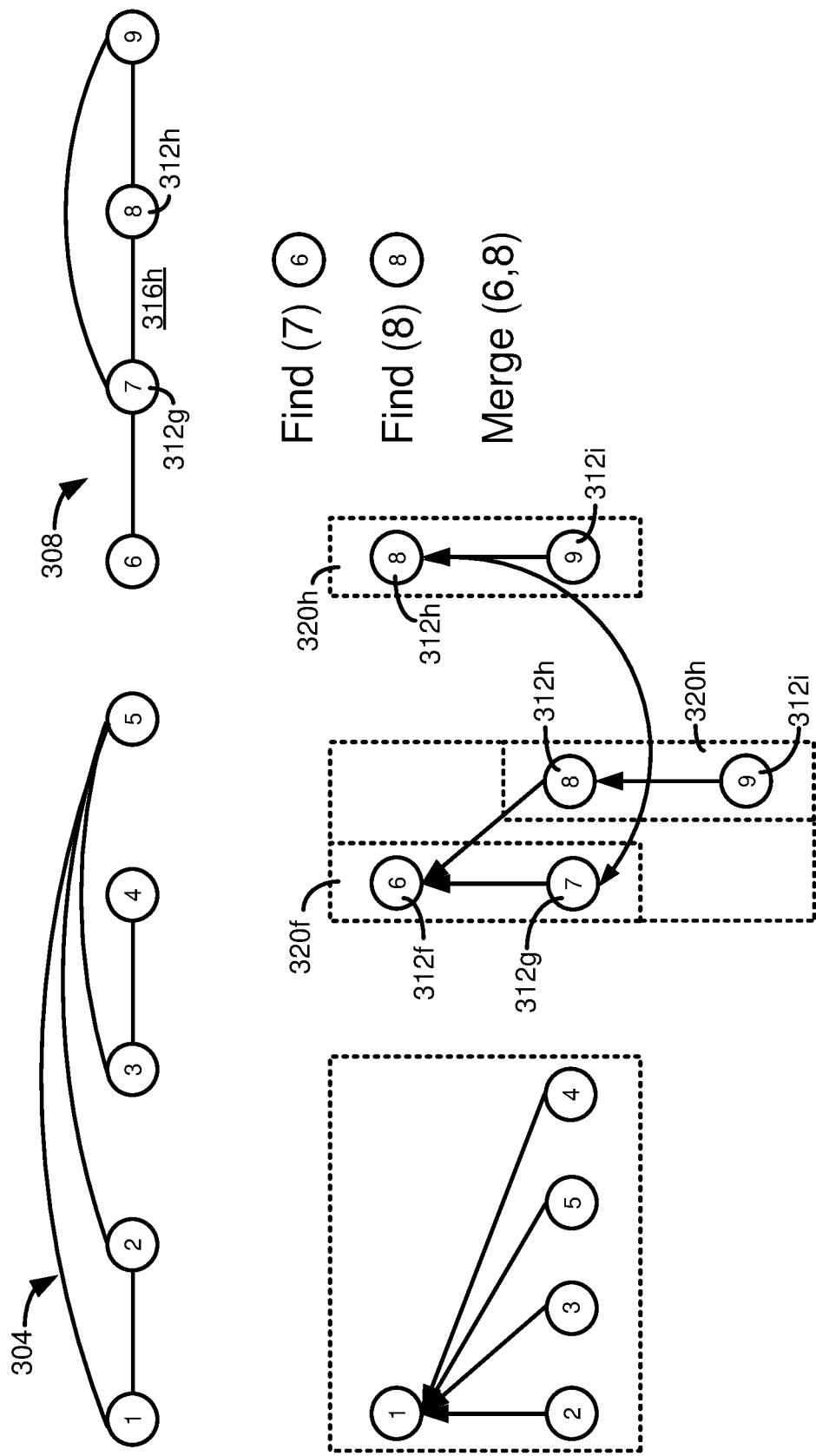

FIG. 3I also illustrates how an edge 316h is next considered that connects node 312g and node 312h. It is determined that nodes 312h is in packet 320h and node 312g is in packet 320f. Since the nodes 312g and 312h, are in different packets, packet 320h with its node 312h is merged into packet 320f, as shown in FIG. 3J.

Figure 3J:
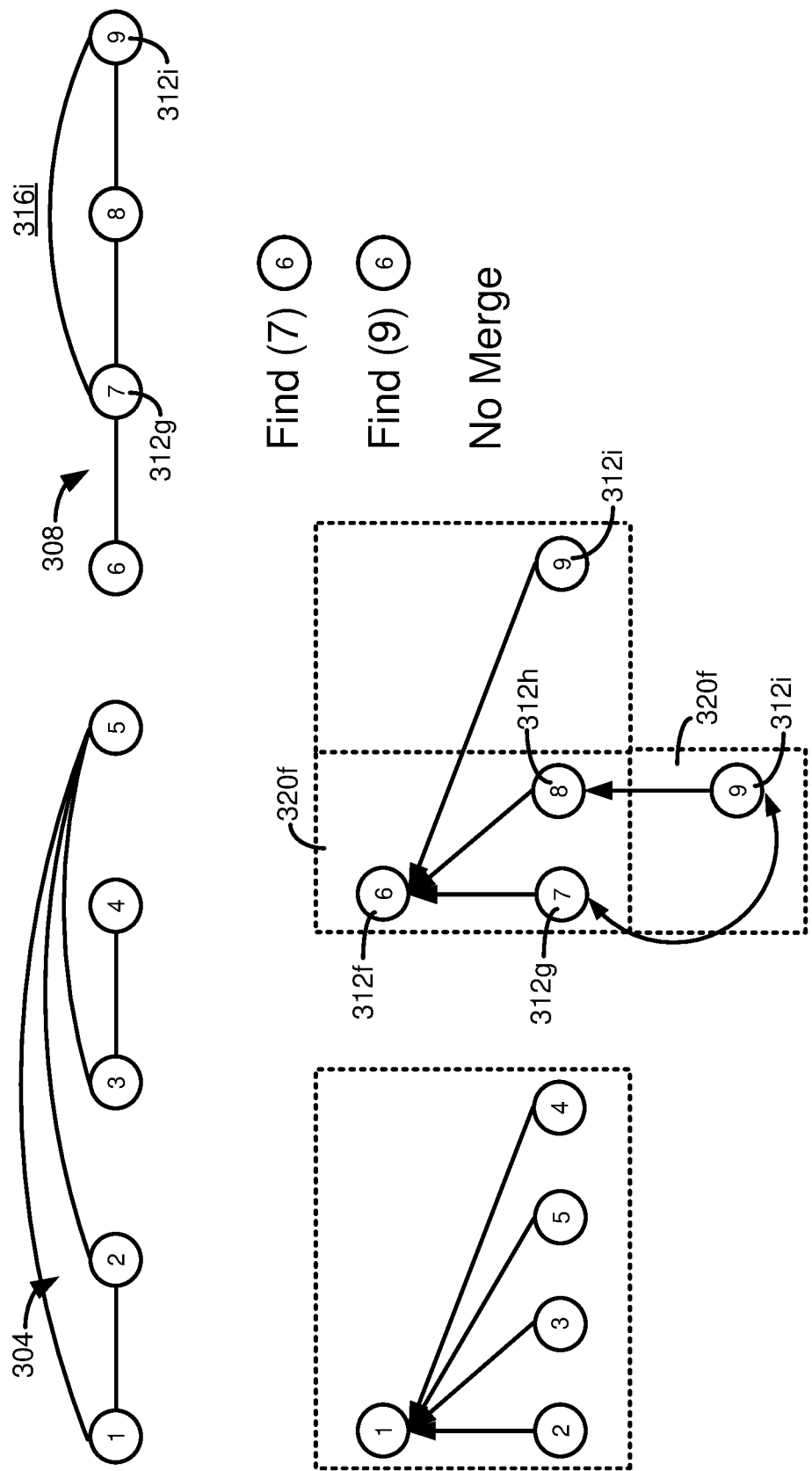

In FIG. 3J, an edge 316i is next considered that connects node 312g, in packet 320f, with node 312i, also in packet 320f. Since nodes 312g and 312i are in the same packet, no merge operation is performed.

Figure 3K:
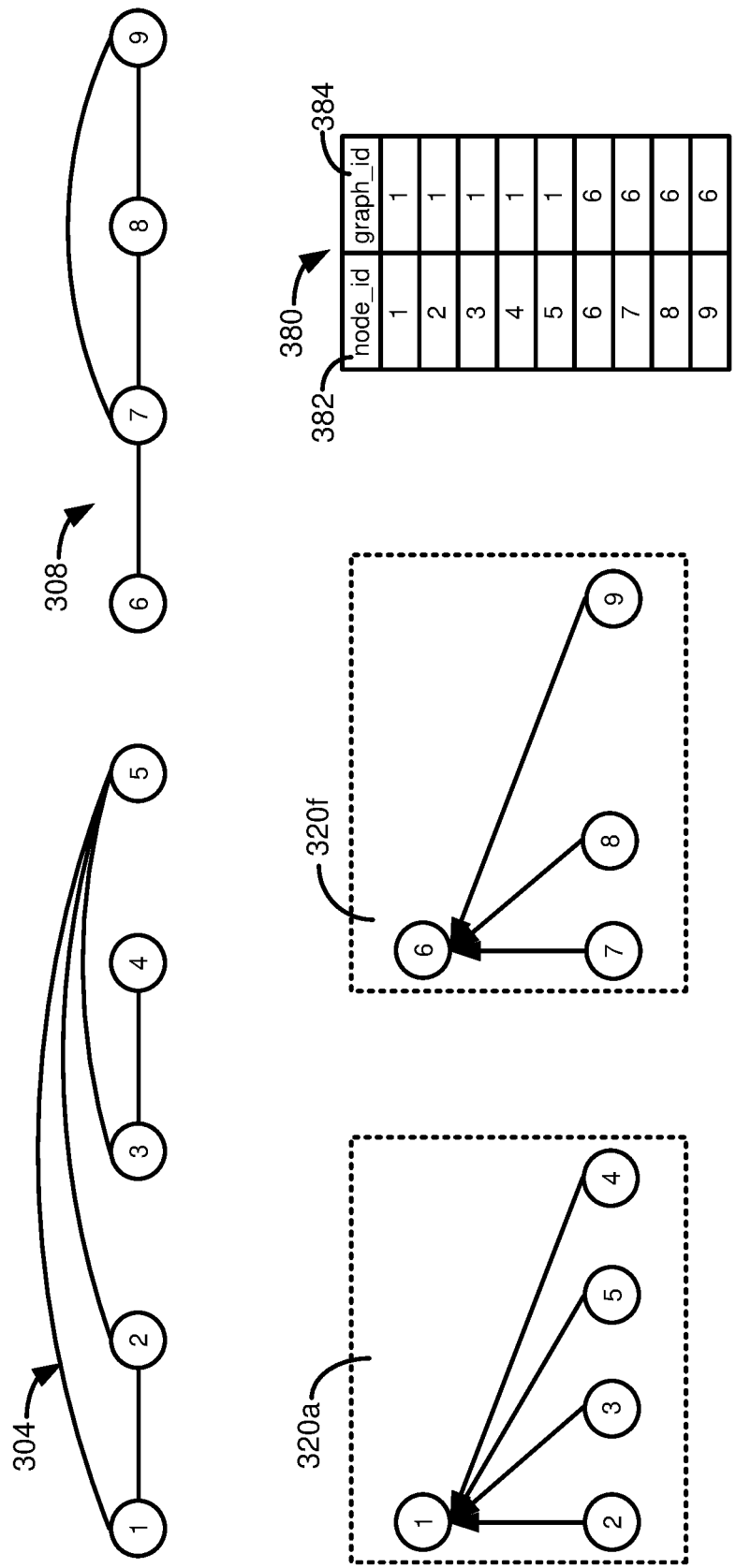

At this point, no edges 316 remain to be analyzed, and so final results of the find and merge process are shown in FIG. 3K. Packets 320a and 320f remain, where packet 320a includes nodes 312a-312e, and packet 320f includes nodes 312f-312i. The packets 320a, 320f, and their collection of nodes, represent disconnected graphs. The information for these two graphs can be summarized, such as in table 380, which includes a column 382 with entries (rows) for each node 312 and a column 384 indicating to which graph, or packet 320, a given node 312 belongs.

Note that an order in which edges 316 are considered, or how packets 320 are merged, does not affect a final outcome of the find and merge technique. For instance, consider a merge step where packets 320a, 320b are merged. Packet 320b could be merged into packet 320a, or packet 320a could be merged into packet 320b, but the outcome of the find and merge process would provide the same final result.

Example 4—Example Network Update Process

The process of identifying connected nodes described in FIGS. 3A-3K can be very time consuming and resource intensive, as common use cases can involve thousands of nodes and edges. As described in Examples 1 and 2, recalculating connected components given the addition or removal of one or more nodes or edges can thus be extraordinarily time consuming and resource intensive, and may simply be impractical to implement for many use cases. The present disclosure provides techniques that address these issues by simplifying the process for updating connected components after a change to nodes/edges. In general, the technique operates by tracking nodes and edges affected by the addition or deletion of nodes, although similar techniques can be implemented for considering added/deleted edges, or a combination of added/deleted nodes and added/deleted edges.

Figure 4:
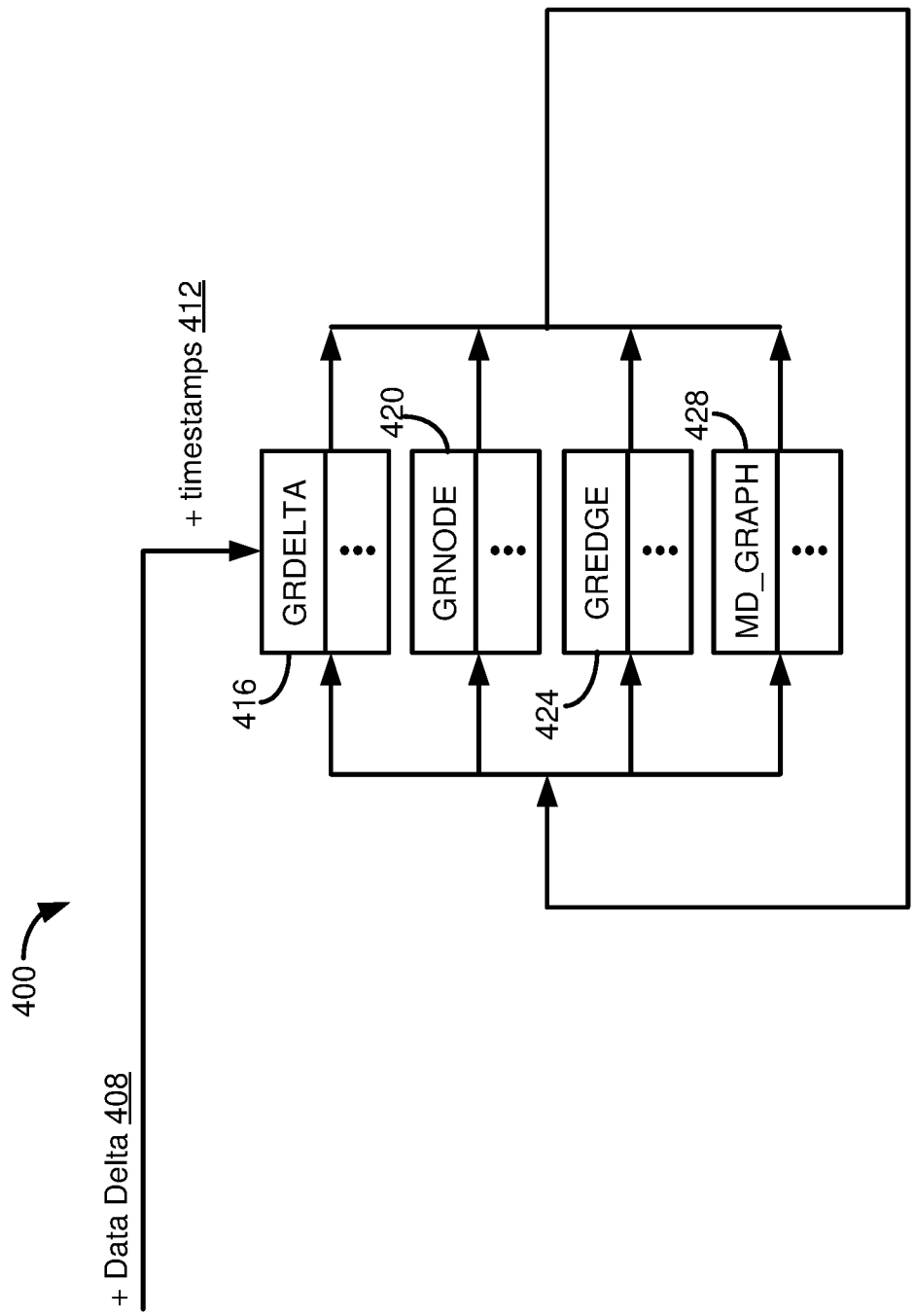
FIG. 4 is a diagram illustrating a network update process and data structures that can be used for updating networks when one or more changes to a network structure are received.

FIG. 4 presents an overview of a particular implementation of a node update process, including providing an overview of an overall process 400 for a "delta calculation,"

and data structures that can be used in implementing the process. Input to the process 400 includes changes to data 408 corresponding to, or used in defining, nodes to be analyzed for connectivity. These changes, in the described process, include the addition or deletion of nodes, or changes to nodes (which are typically processed by treating a change as a deletion of the prior version of a node and the addition of a new version of the node). In at least some cases, such as when a delta calculation is not performed on every change, or when further changes to nodes can be made while a delta calculation is performed, it can be useful to associate the changes to data 408 with respective timestamps 412, where the timestamp can indicate when a change was made or when the change was processed by a computing system implementing the process 400. Typically, it is desirable that at least actions affecting a particular node are arranged chronological in an order in which the operations were actually carried out, as the delta calculation can be order dependent. For instance, the outcome of a node deletion followed by a node addition may not be the same as an outcome of a node addition followed by a node deletion. In other cases, rather than a timestamp, other information, such as a sequence number, can be used to order node/edge operations.

The changes 408 and associated timestamps 412 are stored in an instance 416 (referred to hereinafter as a "delta table", labelled "GRDELTA" in FIG. 4) of a first data structure or data type storing change, or "delta" information, where the data type can be an abstract or composite data type, and can be a computing "object" or "artifact." In a particular example, the instance 416 is in the form of a table, such as a table in a relational database system. Details of the delta table 416 will be further described, but for now consider that the delta table includes information regarding node additions and deletions and timestamps associated with these actions. For the sake of convenient presentation, other computing data structures, data types, objects, etc. that can be used in implementing the process 400 will be described as "tables," but it should be appreciated that, unless indicated otherwise, these "tables" can be implemented in alternative ways, in a similar manner as for the delta table 416.

The changes in the delta table 416 are applied to information defining an existing, current state of the nodes and their connections (edges). In the particular example of the process 400, node information is stored in a node table 420, and edge information is stored in an edge table 424. A "graph" table 428 summarizes the assignment of nodes to one or more graphs (that is, the table 428 can include multiple graphs, but a node is associated with a single graph of the multiple graphs).

In the process 400, information from the tables 416, 420, 424, 428 is read and processed to determine how changes in the delta table affect graphs whose definitions are recorded in the tables 420, 424, 428. At the end of the process 400, the tables 416, 420, 424, 428 are updated. Updating the delta table 416 can include deleting entries for processed changes, or indicating (such as using a flag) that the entries have been processed, which can avoid reprocessing of a same change. The tables 416, 420, 424, 428 are updated based on graph changes determined after applying the changes in the delta table 416. Tables 420, 424, 428 store update graph definitional information/information associating nodes with graphs.

Example 5—Example Network and Supporting Data Structures for Nodes and Edges

Figure 5:
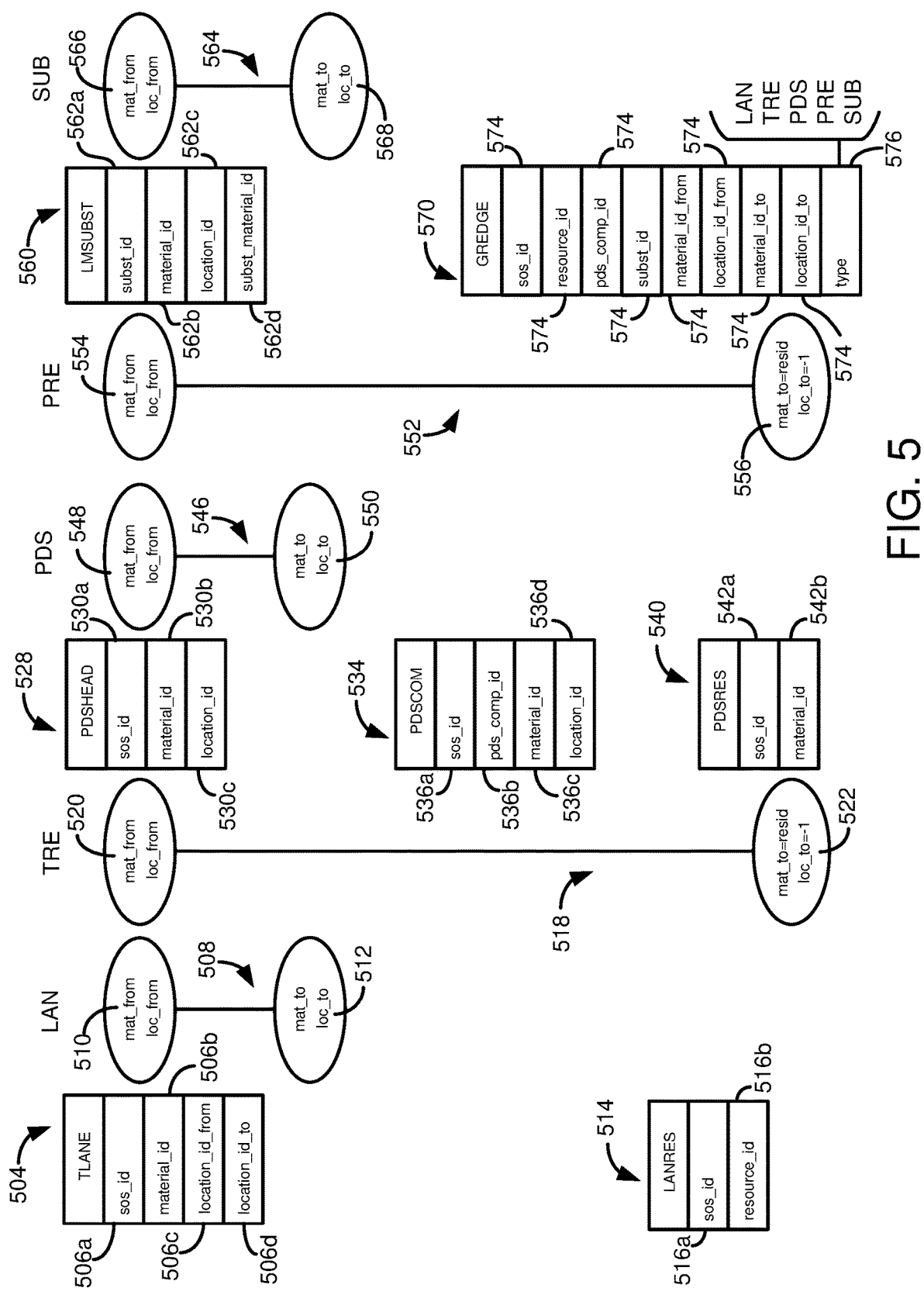
FIG. 5 is diagram illustrating how various types of graph edges may be defined, data structures from which edge information may be obtained, and an example data structure for maintaining data about edges present in a particular set of one or more graphs.
Figure 6:
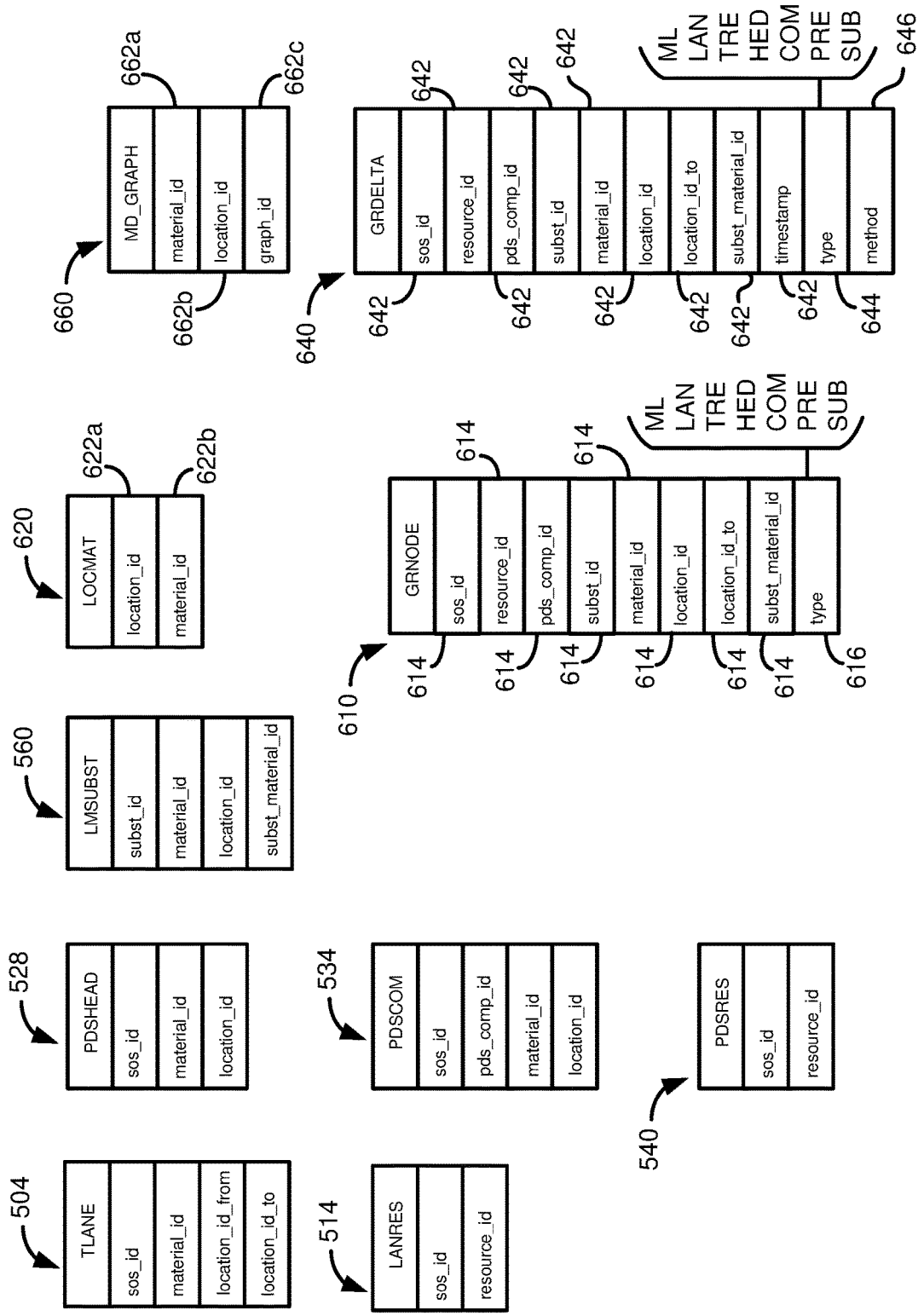
FIG. 6 is a diagram illustrating information for various types of nodes, including data structures in which such information can be stored, and data structures that summarize node definitional information or information regarding how nodes are related to graphs in a set of disconnected graphs formed from a plurality of nodes.

FIGS. 5 and 6 illustrate node and edge information for a particular type of graph to which the process 400 can be applied. The graph represents data and associated data structures that can be used in a supply chain planning context, although the innovative techniques of the present disclosure can be used in other contexts. In addition, as described, computing process planning can be analogous to supply chain planning in the manufacturing context, and so the data and data structures can be used with analogous data for a computer-implemented process.

FIG. 5 provides information that can be used to define graph edges. The graph edges can have different types. One or more types of edges can be used to define how materials (which can include data, for computer-implemented processes) are transported between nodes. An edge type refers to an edge that includes or conveys information about a particular type of relationship between nodes connected by an edge. In general, a "type" for an edge refers to a particular category, classification, or description of feature that different subsets of a collection of edges have in common. Edges of multiple types can connect pairs of nodes, indicating different relationships between the nodes, and where a relationship between nodes may continue to exist with an edge of one type even if an edge of another type no longer connects a given pair of nodes.

A table 504 summarizes information indicating how a component for a particular output is transported between locations. Accordingly, the table 504 has a field 506a indicating an output with which a material, having a material identifier in a field 506b, is associated. Fields 506c and 506d indicate, respectively, a location from which the material will be transported and a location to which the material will be transported. Field 506a serves as the primary key for the table 504.

The information in the table 504 can be used to define an edge 508 of type LAN, ends of which have a format (tuple) of material identifier, location identifier, where the edge has a first end 510, having the tuple of material_from (material identifier 506b), location identifier from (field 506c) and a second end 512 having the tuple of material_to (material identifier 506b), location identifier to (field 506d). Other edges described in this Example 5 can have a similar structure—{material id, location}.

Transportation of a resource typically itself involves a resource, a transportation resource. A transportation resource can be a communication connection, or a physical means of transporting physical objects, such as a train car, a truck, a plane, etc. Transportation resources can be assigned to/be associated with a particular output, and this information can be maintained in a table 514, having a field 516a that identifies the output (analogous to field 506a) and a field 516b identifying a specific transportation resource. The fields 516a, 516b together form the primary key of the table 514.

The tables 504, 514 can together be used to define of edge 518 of type TRE. The edge 518 has a first end 520 in the form of a tuple, having a first element of a value of the field 506b and a second element of a value of the field 506c. A second end 522 of the edge 518 is also in the form of {material, location}, but the material value corresponds to the value of the field 516b (identifying a specific transportation resource), and the location is assigned a default value for the end 522 of a TRE edge 518, such as "−1." The default value is used, since it may be desirable to have all of the edges have a common tuple format, but a "location to" is not needed in the end 522.

A table 528 summarizes, for particular outputs (whose value in a field 530a serves as a primary key for the table 528), materials (identifiers of which are provided in a field 530*b*) and corresponding material locations (identifiers of which are provided in a field 530*c*) used in producing a given output.

A production data structure can summarize materials and components used in producing particular outputs. Components used in producing an output are stored in a table 534, where the table includes a field 536*a* storing a value identifying a particular output and a field 536*b* storing a component identifier value, where the component identifier value identifies a particular component of a given output, and where the fields 536*a*, 536*b* together serve as the primary key for the table 534. The table 534 also includes fields 536*c*, 356*d* storing, respectively, materials and material locations associated with particular components of the production data structure.

Materials associated with a production data structure can also be associated with resources, which can be referred to as production resources. Examples of production resources can include storage resources and various types of machines that may be used to process materials. Information about production resources can be stored in a table 540. The table 540 has a field 542*a* identifying a particular output and a field 542*b* identifying a particular production resource. Together the fields 542*a*, 542*b* serve as the primary key for the table 540.

The tables 528, 534, 540 can be used to define additional edge types, which again have the material, location tuple structure. An edge 546 of type PDS has an end 548 that includes values from the fields 530*b*, 530*c* and an end 550 that includes values from the fields 530*b*, 530*c*. An edge 552 of type PRE has an end 554 that is defined analogously to the end 548 of the PDS edge 546 and an end 556 that includes values from the field 542*b*. For similar reasons as described for the TRE edge 518, the "location" member of the tuple of the end 556 is set to a default value, such as "−1."

For various reasons, it may be desirable to substitute one material for another in a given modelled process (a process for producing a particular output). For instance, a particular material may no longer be available, or an existing quantity of a material may be reserved for use in producing another output modelled by a different process (or, even within a single process a material may be used multiple times and it may be desired to make a substitution of one instance of the material rather than at another instance of the material).

Substitution information can be maintained in a table 560. The table 560 includes a field 562*a* identifying a particular substitution and serving as the primary key for the table. The table 560 further includes fields 562*b*, 562*c* identifying a material and location for which the substitution is defined, and a field 562*d* identifying the material to be used in place of the material 562*b*. In at least some cases, it is presumed that the materials associated with fields 526*b*, 562*d* are at the same location.

The information in the table 560 can be used to define an edge 564 of type SUB. The edge 564 has a first end 566 having values of the fields 562*b*, 562*c* and a second end 568 having values of the fields 562*d*, 562*c*.

A table 570 summarizes information for the different edge types 508, 518, 546, 552, 564. The table 570 can correspond to a particular implementation of the table 424 of FIG. 4. The table 570 includes fields 574 that correspond to the primary key fields of the tables 504, 514, 528, 534, 540, 560 and which together form the primary key of the table 570. The table 570 additional includes a field 576, which indicates a particular type of a particular edge (primary key value) of the table 570. The type value in a cell for the field 576 of a given row of the table 570 indicates whether the row corresponds to an edge 508, 518, 546, 552, 564, (or, in more semantic terms, whether the edge is of type LAN, TRE, PDS, PRE, or SUB).

Turning to nodes of the graph, the nodes can be defined based on the tables 508, 518, 546, 552, 564 of FIG. 5, which are reproduced in FIG. 6 for convenience. Node information can be further included in a table 620, LOCMAT, that summarizes materials and locations. The table 620 includes a field 622*a* that identifies a material and a field 622*b* that identifies a location of the material. The LOCMAT table 620 identifies materials and locations as nodes, regardless of whether they are connected to other nodes. Nodes in the LOCMAT table 620 can be associated with particular types of edges or node types. Thus, nodes in the LOCMAT table 620 may appear in one or more of the other tables 508, 518, 546, 552, 564. Note that nodes in the LOCMAT table 620 are not associated with an output (for example, 506*a*), and so including of a node in the LOCMAT table in another table helps identify that nature of a node/how the node is used, in addition to tying the node to particular outputs/processes.

The node information can be used to create particular implementations of the tables 420, 424, 428 of FIG. 4. In particular, a table 610 defines nodes used in producing particular outputs. Like the table 570 of FIG. 5, the table 610 includes the primary key values of the tables 508, 518, 546, 552, 564 as fields 614. The node table 610 further includes a field 616 indicating a node type. The node type field 616 indicates which of the tables 508, 518, 546, 552, 564 is the basis of a particular entry (row) of the table 610, or, in semantic terms, whether a node is of type LAN, TRE, HED, COM, PRE, ML (for the LOCMAT table 620), or SUB, respectively.

Note that a given node may have multiple types. For example, a particular node (material, location) may be a substitution in a process for producing a first output, and may be a component of an output in a process for producing a second output. Or, a node can be a component of a process (type PDSCOM, or COM), but can also be associated with a transportation lane (tyle TLANE, or LAN). In other words, the table 620 can list all nodes (material, location tuples), while the tables 508, 518, 546, 552, 564 are used to define edges between nodes and indicate types of particular nodes (how the nodes are used in one or more processes), where some nodes in the table 620 may not be associated with a type or have edges to other nodes.

Information from the tables 508, 518, 546, 552, 564 can also be used in a table 640 that is used to track node changes, corresponding to a particular implementation of the table 416 of FIG. 4. As with the table 620, the table 640 includes fields 642 corresponding to the primary key fields of the tables 508, 518, 546, 552, 564. The table 640 includes a field 644 that indicates a type of a node for a given row of the table, and is analogous to the type field 616 of the table 610. A field 646 is included in the table 640, and is used to indicate a type of delta operation. In particular, values of the field 646 can indicate whether the node has been added or deleted.

Edges can be determined by having one node type that refers to another type, such as a node for a transportation lane (TRE) referencing a LOCMAT node. So, when nodes are added (or deleted and then a new version of a node added), a new edge is created if the added node references an existing node. Correspondingly, deletion of a node results in the removal of that node's contribution to edges to other nodes.

FIG. 6 further illustrates a table 660 that is used to assign individual nodes, having primary keys provided by fields 662a, 662b, to particular graph identifiers populated in field 622c. The table 660 can be used to quickly determine whether two nodes are in the same graph or are in disconnected graphs.

Example 6—Example Use of Supporting Data Structures in Network Update Process

Figure 7:
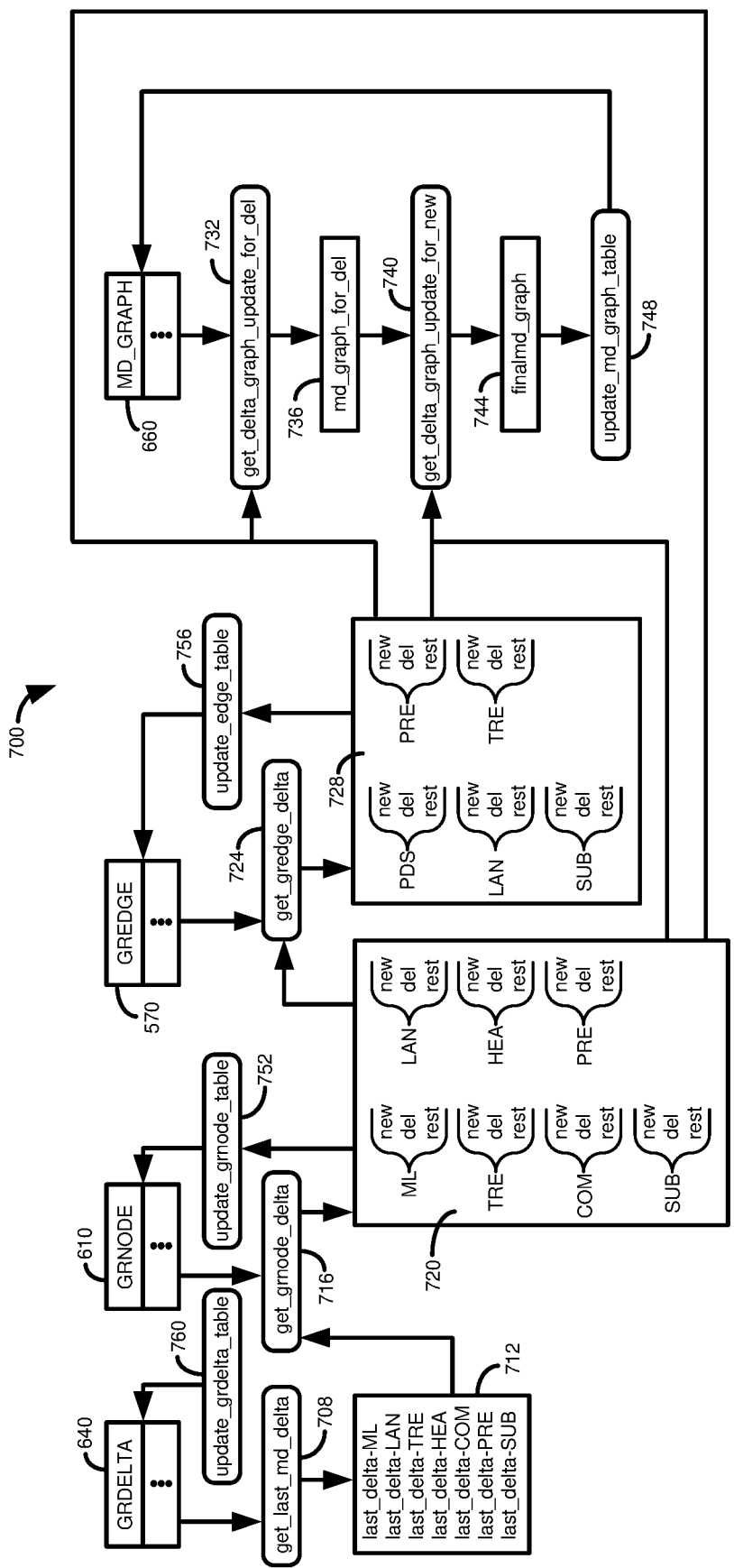
FIG. 7 is a diagram illustrating a network update process of FIG. 4 used in conjunction with the network elements and connection information of FIGS. 5 and 6.

FIG. 7 is a flowchart of a process 700 that represents a particular implementation of the process 400 of FIG. 4, using the nodes, edges, and supporting data structures described in conjunction with FIGS. 5 and 6.

At 708, a method is called to get data changes to be processed, which, in the specific use case of supply chain planning can be changes to master data ("md"). As discussed in conjunction with Example 4, changes are associated with timestamps, and indicate whether nodes have been added or deleted, and are associated with a node type. The change data can be read from the delta table 640 of FIG. 6. It is possible in some scenarios that multiple actions might be taken with respect to a node in a given set of changes, such as having a node both be added and deleted. Accordingly, as part of the processing at 708 a last change for a given node can be identified, using the timestamp information, and the last change will be used in updating graphs.

The changes to both nodes and edges can be grouped by type, and a last change by type considered as part of an update process. Grouping the changes by type can be helpful, including by improving processing speed and efficiency. In the case of a node, for example, if the node is of a particular type, such as LAN (as in the TLANE table 504), then only changes to other LAN nodes need be considered as part of an update process for LAN nodes, since LAN nodes are only connected via edges to other LAN nodes. Since LAN nodes are not connected to RES nodes (LANRES table 514), addition or deletion of a LAN node is not affected by, and does not affect, addition of deletion of a RES node. Similarly, if a new PDS node is added, such node is considered with COM nodes, since PDS nodes are connected to COM nodes. However, since edges can be created in multiple ways, changes for each node type (a last change per node type) should be considered in order to appropriately determine whether some edge connects any pair of nodes.

The processing at 708 produces a set of changes 712. The changes 712 can be specific changes for specific nodes (e.g., a specific action for a specific node), or the change information can be a set of nodes, where the set of nodes can be later analyzed to determine changes compared to a set of nodes (and edges) maintained from an initial definition/state or a state resulting from a prior update operation.

Node changes can be determined using a method that executes at 716. The method can access the node information table 610, such as to compare a set of nodes in the delta information 712 to a prior set of nodes as indicated in the node information table 610. The comparison produces a set 720 of nodes, optionally grouped by node type, and indicating at least whether particular nodes have been added or deleted, and optionally listing nodes that remain unchanged. Maintaining information about unchanged nodes can be useful, for example, when the set 720 is used to update the table 610 as part of the completion of an update process.

The set 720 of nodes can be processed at 724 using a method that determines changes to edges, to produce a set of edge changes 728, which, as for the set of node changes 716, can list new, deleted, and optionally unchanged edges, optionally grouped by edge type. The processing at 724 can compare information in the set 720 of nodes to a current list of edges provided in the edge table 570 of FIG. 5.

With the updated node and edge information, at 732, the process 700 processes deleted nodes to produce an intermediate set 736 of nodes resulting from node deletion. The processing at 732 can use a prior set of node to graph assignments in the table 660.

The set 736 is further processed at 740 to add new nodes, resulting in a final set of nodes 744. As part of the processing at 740, a set of nodes that removes deleted nodes and adds new nodes can be processed using a graph discovery algorithm, such as using the find and merge technique. However, as will be further described, the graph discovery technique can start using a "base" state where unchanged nodes remain with their originally assigned graphs. So, for example, if a process involves hundreds of nodes, and only a few nodes are changed as part of an update, significant graph changes can result, but the graph process need not process unchanged nodes.

After the final set of nodes 744 is determined, at 748, a method can be called where the tables 570, 610, 640, 660 used in the process 700 are updated, as described for the tables 416, 420, 424, 428 in the process 400 of FIG. 4. At 752, a method executes to update the node table 610, using the set of nodes 720. At 756, a method executes to update the edge table 570 using the set of edges 728. At 760, a method executes to update the delta table 640, such as by deleting processed entries or updating the entries to indicate that they have been processed (and optionally information indicating when the processing occurred). The method 700 can then be repeated to process a new set of updates.

Example 7—Example Network Update on Addition or Deletion of Nodes/Edges

Figure 8:
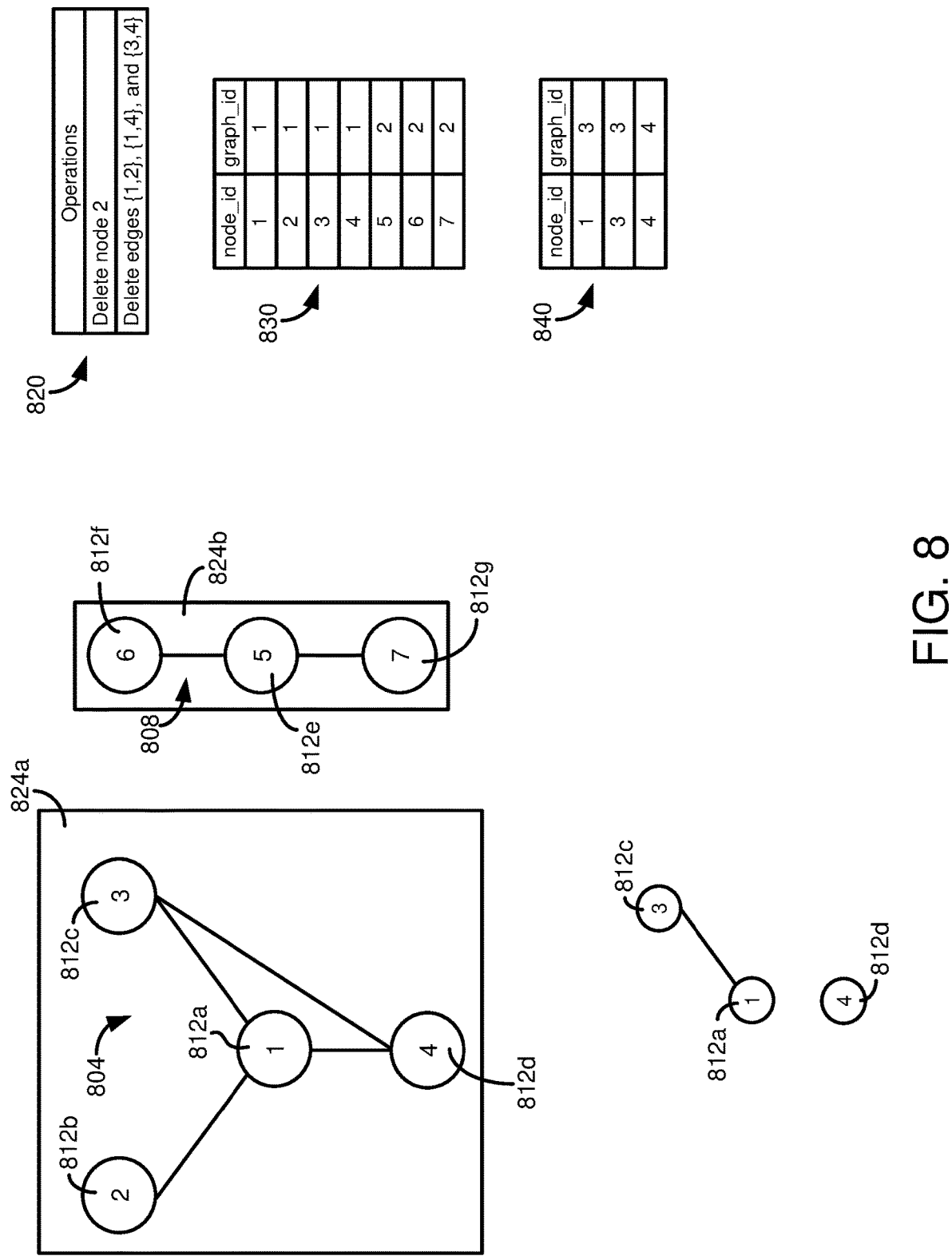
FIG. 8 is a diagram illustrating a process for updating a network to account for deletion of one or more network elements or connections therebetween.

FIG. 8 illustrates how a node deletion process can be carried out, which can be an example of the node deletion process 732 of FIG. 7, although the deletion process is described in conjunction with graphs 804, 808 that are more similar in format to the graphs 304, 308 of FIGS. 3A-3K for ease of presentation. In particular, graph 804 has nodes 812a-812d, with edges between nodes 812a and 812b, 812a and 812c, 812a and 812d, and 812c and 812d. Graph 808 has nodes 812e-812g, with edges between nodes 812e and 812f and between nodes 812f and 812g.

In FIG. 8, operations 820 were determined that indicate that node 812b is to be deleted, which results in the deletion of edges involving node 812b. In addition, the operations 820 further include deleting some edges that do not involve node 812b, such as deleting edges connecting nodes 812a and 812d, and nodes 812c and 812d. Table 830 provides assignments of nodes to graphs prior to the deletion operations (where the graph id 1 corresponds to the graph formed by nodes in a packet 824a and the graph id 2 corresponds to the graph formed by nodes in a packet 824b). Table 840 provide assignments of nodes to graphs after the deletion operations are carried out.

FIG. 8 illustrates an advantage of the disclosed subject matter. Since graphs 804 and 808 were known to be disconnected, and the deletion operations only affect graph 804, graph 808 can be ignored when processing deletion operations. The table 840 thus only includes node and graph information for the nodes remaining in graph 804 after removal of node 812d and deletion of the identified edges.

Figure 9:
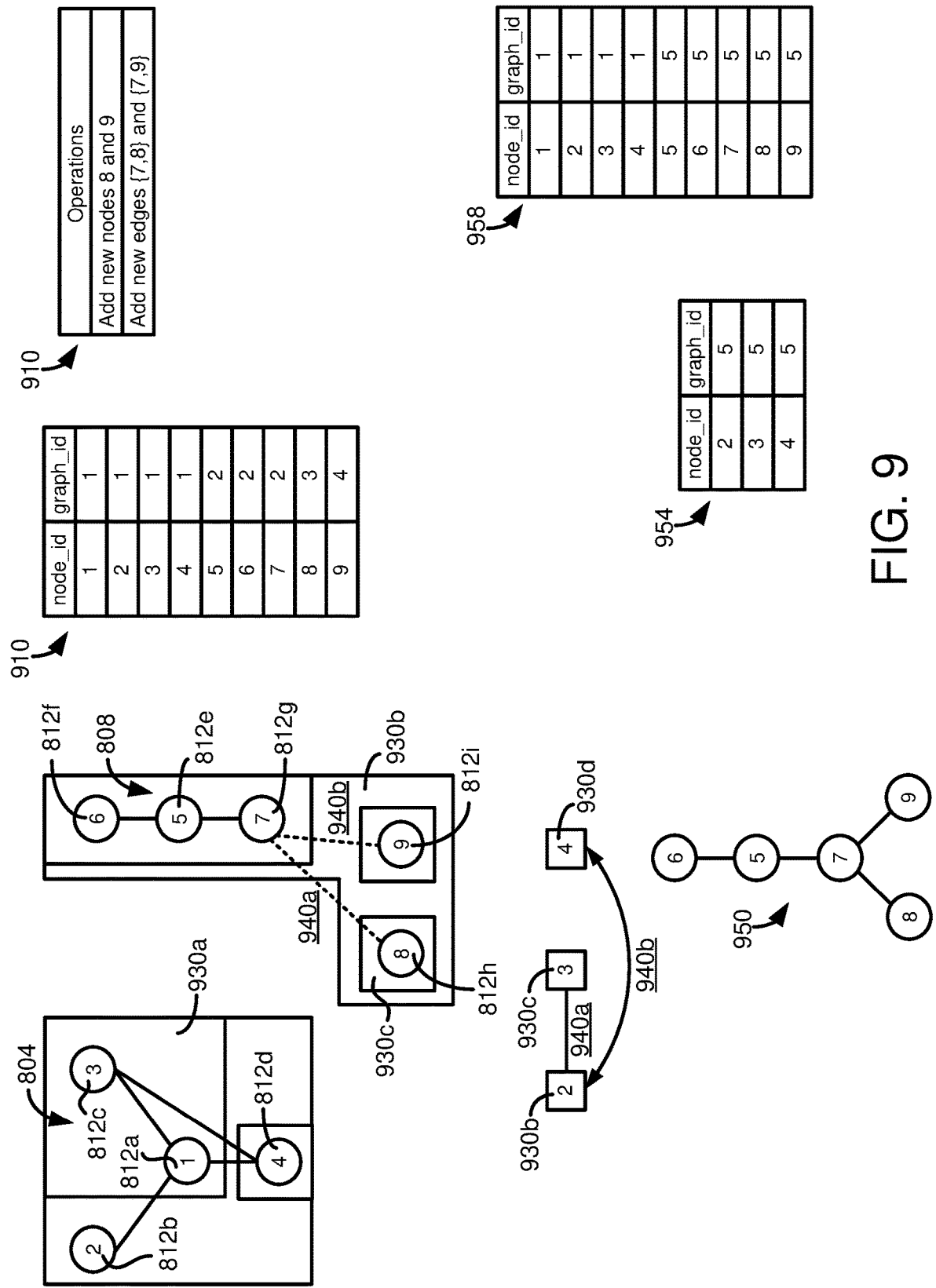
FIG. 9 is a diagram illustrating a process for updating a network to account for addition of one or more network elements or connections therebetween.

FIG. 9 illustrates how node addition actions are applied to graphs. A scenario illustrated in FIG. 9 starts with the graphs 804, 808 and their respective sets of nodes 812a-812d and 812*e*-812*g*. Operations 910 include the addition of two nodes, 812*h*, 812*i*, and edges between nodes 812*g*, 812*h* and nodes 812*g*, 812*i*.

A graph discovery algorithm, such as find and merge, is applied to existing versions of the graphs 804, 808. Analyzing the edges, it is determined that the added nodes 812*g* 812*h* only connect to nodes in graph 808. Accordingly, since it is known that graphs 804 and 808 were disconnected prior to receiving the operations 910, graph 804 need not be considered in the graph discovery algorithm.

The graph discovery process considers nodes 812*e*-812*g* to be in a packet 930*b* (where non-participating nodes 812*a*-812*d* can be considered as part of a packet 930*a*) and new nodes 812*h*, 812*i* are assigned to respective packets 930*c*, 930*d*.

The find and merge algorithm can then be applied as described in conjunction with FIGS. 3A-3K. Briefly, the algorithm analyzes an edge 940*a* connecting nodes 812*g*, 812*h*. Since the nodes are in different packets 930*b*, 930*c*, packet 930*c*, and its node 812*h*, are merged into packet 930*b*. An edge 940*b* connecting nodes 812*f*, 812*i* is analyzed. It is determined that the nodes are in different packets 930*b*, 930*d*. Accordingly, packet 930*d*, and its node 812*i*, are merged with packet 930*b*. The merge process results in a graph 950. The assignment of the packets to graph identifiers is summarized in table 954. Table 958 summarizes the assignments of nodes to graph identifiers, where all of the nodes 812*e*-812*i* in the graph 958 are shown as being assigned to the identifier ("5") for the graph 950.

Figure 10:
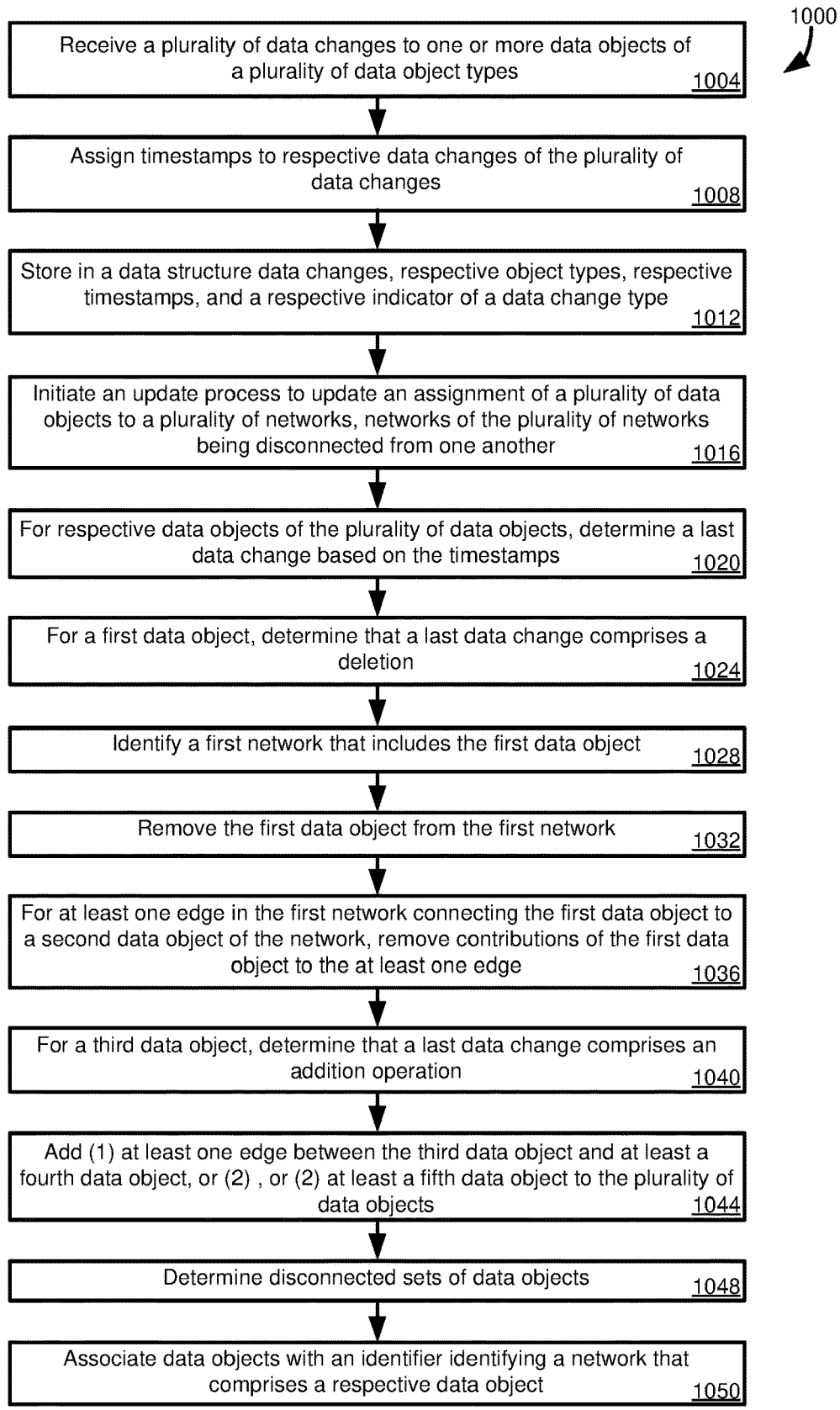
FIG. 10 is a flowchart illustrating a technique for determining connected data objects after the addition and deletion of data objects.

Example 8—Example Operations in Updating Network Definitions After Data Change Operations FIG. 10 illustrates a process 1000 for updating network definitions for a plurality of data objects based on changes to the data objects, including deleting a type associated with a data object.

At 1004, a plurality of data changes to one or more data objects of a plurality of data object types are received. Timestamps are assigned to respective data changes at 1008. At 1012, data changes, respective data object types, respective timestamps, and a respective indicator of a type of data change are stored in a data structure.

An update process is initiated at 1016 to update an assignment of a plurality of data objects to a plurality of networks, networks of the plurality of networks being disconnected from one another. For respective data objects, a last data change is determined at 1020 based on the timestamps. At 1024, for a first data object, it is determined that a last data change is a deletion operation. A first network that includes the first data object is identified at 1028. At 1032, the first data object is removed from the first network. For at least one edge in the first network connecting the first data object to a second data object of the network, contributions of the first data object to the at least one edge are removed at 1036.

At 1040, it is determined that a last data change for a third data object is an addition operation. At least one edge is added at 1044 between the third data object and at least a fourth data object, or at least a fifth data object is added to the plurality of data objects. Sets of disconnected data objects are determined at 1048. At 1050, data objects are associated with respective identifiers identifying a network that includes respective data object.

Example 9—Computing Systems

Figure 11:
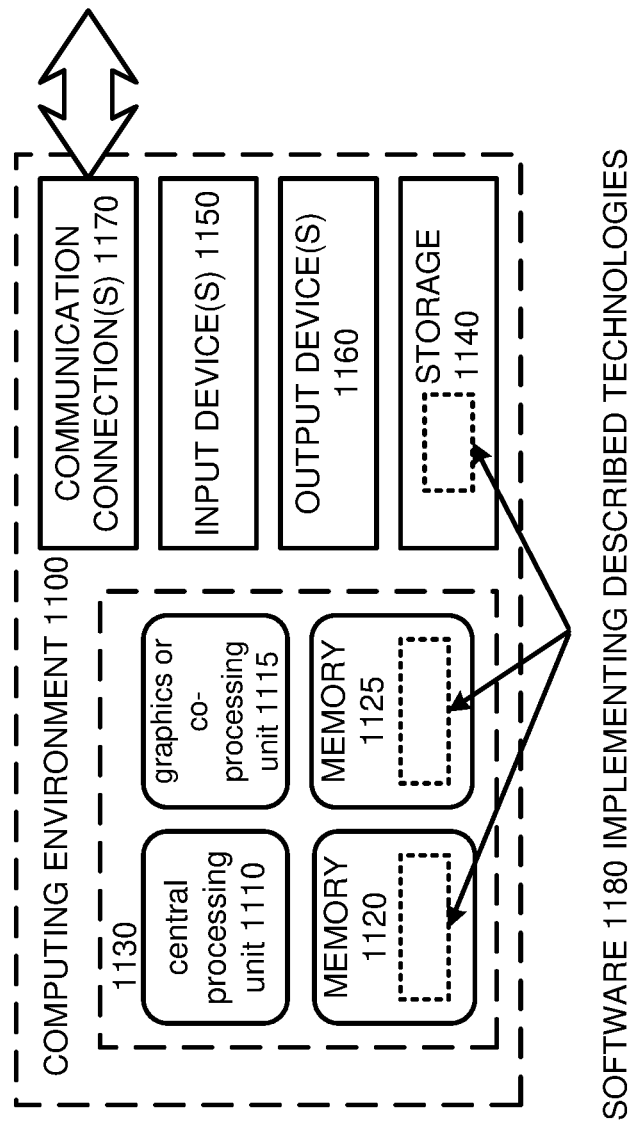
FIG. 11 is a diagram of an example computing system in which some described embodiments can be implemented.

FIG. 11 depicts a generalized example of a suitable computing system 1100 in which the described innovations may be implemented. The computing system 1100 is not intended to suggest any limitation as to scope of use or functionality of the present disclosure, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions, such as for implementing the innovations described in Examples 1-8. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 stores software 1180 implementing one or more innovations described herein, in the form of computer-executable instructions suitable for execution by the processing unit(s) 1110, 1115.

A computing system 1100 may have additional features. For example, the computing system 1100 includes storage 1140 (such as for storing data of the data store 222), one or more input devices 1150, one or more output devices 1160, and one or more communication connections 1170, including input devices, output devices, and communication connections for interacting with a user. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way, and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 12:
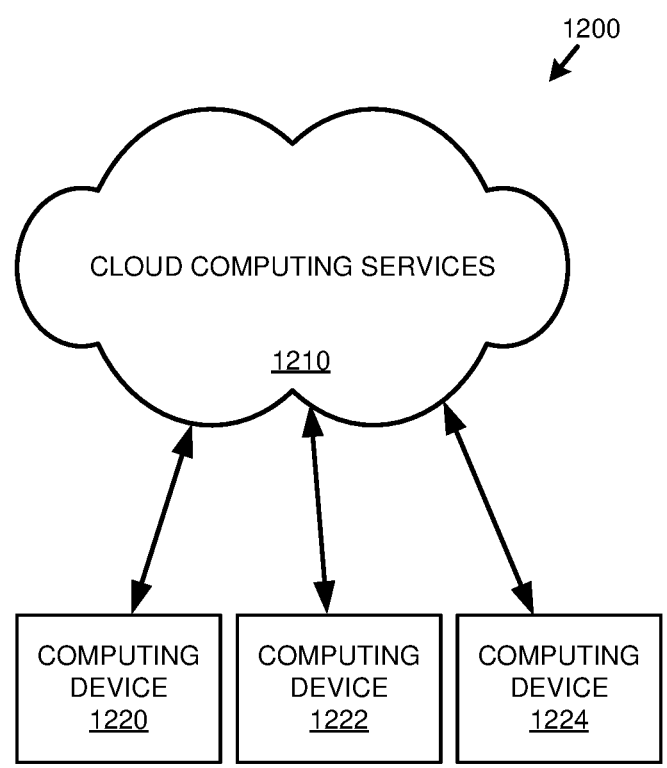
FIG. 12 is an example cloud computing environment that can be used in conjunction with the technologies described herein.

FIG. 12 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operations (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 12, computer-readable storage media include memory 1220 and 1225, and storage 1240. The term computer-readable storage media does not include signals and carrier waves. In addition, the term computer-readable storage media does not include communication connections (e.g., 1270).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
at least one hardware processor;
at least one memory coupled to the at least one hardware processor; and
one or more computer-readable storage media comprising computer-executable instructions that, when executed, cause the computing system to perform operations comprising:
receiving a plurality of data changes to one or more data objects, data objects of the one or more data objects being of a plurality of data object types;
assigning timestamps to respective data changes of the plurality of data changes;
storing in a data structure data changes, respective object types, respective data change timestamps, and a respective indicator of a data change type;
initiating a graph update process to update an assignment of a plurality of data objects to a plurality of graphs, respective graphs of the plurality of graphs being disconnected from one another, being comprised of a grouping of one or more data objects that are connected via edges, and being associated with a respective identifier identifying the respective graph;
for respective data objects of the plurality of data objects, determining a last data change for the respective data object based on the timestamps;
for a first data object of the plurality of data objects, determining that a last data change for the first data object comprises a deletion operation;
identifying a first graph of the plurality of graphs that comprises the first data object;
removing the first data object from the first graph;
for at least one edge in the first graph connecting the first data object to a second data object of the first graph, removing contributions of the first data object to the at least one edge;
for a third data object of the one or more data objects, determining that a last data change for the third data object comprises an addition operation for the third data object;
adding (1) at least one edge between the third data object and at least a fourth data object of the first graph, or (2) at least a fifth data object to the plurality of data objects;
determining updated disconnected groupings of data objects;
based at least in part on the updated disconnected groupings of data objects, associating one or more of the data objects for which a last data change was determined based on the timestamps with an identifier identifying a graph, wherein the updated identifier identifies the respective graph or another graph; and
storing a set of updated graphs based at least in part on the associating one or more of the data objects with their respective updated identifiers, wherein performing read or write operations on data objects of an updated set of disconnected graphs corresponding to the updated disconnected groupings is carried out with improved processing efficiency.

2. The computing system of claim 1, the operations further comprising:
maintaining a first data structure storing identifiers of data objects and an identifier of a data object type for data objects of the plurality of data objects.

3. The computing system of claim 2, the operations further comprising:
maintaining a second data structure storing identifiers of edges connecting data objects in the plurality of graphs, where the edges are of a plurality of edge types and the second data structure stores a respective edge type for respective edges.

4. The computing system of claim 3, the operations further comprising:
after the associating, updating the first and second data structures based on nodes in the plurality of graphs.

5. The computing system of claim 3, wherein the identifying a first graph of the plurality of graphs that comprises the first data object comprises reading at least a portion of the first data structure and reading at least a portion of the second data structure.

6. The computing system of claim 1, wherein object types of the respective object types represent elements of a planning process and a first object type of the respective object types represents an output of the planning process and comprises identifiers of resources used in producing the output and respective locations of respective resources of resources used in producing the output.

7. The computing system of claim 6, wherein resources used in producing an output are transportable between locations, a second object type identifying a transportation resource useable to transport a given resource of the resources between a first location and a second location.

8. The computing system of claim 6, wherein resources used in producing an output are transportable between locations, a second object type identifying a transportation channel comprising a resource, a source location for the resource, and a destination location for the resource.

9. The computing system of claim 1, wherein the removing and the adding are part of the graph update process, the graph update process comprising data changes within a time period, the operations further comprising:
after completing the graph update process, removing data changes processed during the graph update process from the data structure or flagging data changes processed during the graph update process as having been processed.

10. The computing system of claim 1, wherein the adding comprises associating the first graph with a first packet and associating the third data object with a second packet and using a graph discovery algorithm to determine sets of disconnected data objects.

11. The computing system of claim 1, wherein the removing and the adding are part of the graph update process, the operations further comprising:

after completion of the graph update process, storing in a data structure associations between data objects of the plurality of data objects and graphs that comprise respective data objects.

12. The computing system of claim 11, the operations further comprising:
receiving a first request to process a fifth data object of the plurality of data objects, wherein the fifth data object is the first data object, the second data object, the third data object, the fourth data object or is a data object other than the first data object, the second data object, the third data object, or the fourth data object;
receiving a second request to process a fifth data object of the plurality of data objects, wherein the fifth data object is a data object other than the fourth data object;
determining that the fourth data object and the fifth data object are in disconnected graphs;
based at least in part on the determining that the fourth data object and the fifth data object are in disconnected graphs, processing the first request and the second request in parallel.

13. The computing system of claim 11, the operations further comprising:
receiving a first request to process a fifth data object of the plurality of data objects, wherein the fifth data object is the first data object, the second data object, the third data object, or the fourth data object or is a data object other than the first data object, the second data object, the third data object, or the fourth data object;
locking at least a portion of data associated with a graph comprising the fifth data object in response to the first request during execution of the first request, wherein data associated with graphs other than the graph is not locked in response to the first request.

14. The computing system of claim 11, the operations further comprising:
receiving a first request to process a fifth data object of the plurality of data objects, wherein the fifth data object is the first data object, the second data object, the third data object, or the fourth data object or is a data object other than the first data object, the second data object, the third data object, or the fourth data object;
processing the first request by accessing at least a portion of data in a graph comprising the fifth data object but not accessing data stored in other graphs.

15. The computing system of claim 11, the operations further comprising:
receiving a first request to process a fifth data object of the plurality of data objects, wherein the fifth data object is the first data object, the second data object, the third data object, or the fourth data object or is a data object other than the first data object, the second data object, the third data object, or the fourth data object;
processing the first request by loading into memory at least a portion of data in a graph comprising the fifth data object but not loading into memory data stored in other graphs.

16. The computing system of claim 1, wherein the determining a last data change for the respective data objects comprises determining a last change for respective one or more types associated with a respective data object of the respective data objects.

17. The computing system of claim 16, wherein at least a first data object of the one or more data objects concurrently has a plurality of data object types.

18. The computing system of claim 16, wherein the operations comprise data object addition and data object deletion operations and the data object addition and the data object deletion operations are performed on a data object type by data object type basis.

19. A method, implemented in a computing system comprising at least one hardware processor and at least one memory coupled to the at least one hardware processor, the method comprising:
receiving a plurality of data changes to one or more data objects;
assigning timestamps to respective data changes of the plurality of data changes;
storing in a data structure data changes, respective data change timestamps, and a respective indicator of a data change type;
initiating a graph update process to update an assignment of a plurality of data objects to a plurality of graphs, respective graphs of the plurality of graphs being disconnected from one another, being comprised of a grouping of one or more data objects that are connected via edges, and being associated with a respective identifier identifying the respective graph;
for respective data objects of the plurality of data objects, determining a last data change for the respective data object based on the timestamps;
for a first data object of the plurality of data objects, determining that a last data change for the first data object comprises a deletion operation;
identifying a first graph of the plurality of graphs that comprises the first data object;
removing the first data object from the first graph;
for at least one edge in the first graph connecting the first data object to a second data object of the first graph, removing contributions of the first data object to the at least one edge;
for a third data object of the one or more data objects, determining that a last data change for the third data object comprises an addition operation for the third data object;
adding (1) at least one edge between the third data object and at least a fourth data object of the first graph, or (2) at least a fifth data object to the plurality of data objects;
determining updated disconnected groupings of data objects;
based at least in part on the updated disconnected groupings of data objects, associating one or more of the data objects for which a last data changed was determined based on the timestamps with an identifier identifying a graph, wherein the updated identifier identifies the respective graph or another graph; and
storing a set of updated graphs based at least in part on the associating one or more of the data objects with their respective updated identifiers, wherein performing read or write operations on data objects of an updated set of disconnected graphs corresponding to the updated disconnected groupings is carried out with improved processing efficiency.

20. One or more computer-readable storage media comprising:
computer-executable instructions that, when executed by a computing system, cause the computing system to receive a plurality of data changes to one or more data objects;
computer-executable instructions that, when executed by the computing system, cause the computing system to assign timestamps to respective data changes of the plurality of data changes;

computer-executable instructions that, when executed by the computing system, cause the computing system to store in a data structure data changes, respective data change timestamps, and a respective indicator of a data change type;

computer-executable instructions that, when executed by the computing system, cause the computing system to initiate a graph update process to update an assignment of a plurality of data objects to a plurality of graphs, respective graphs of the plurality of graphs being disconnected from one another, being comprised of a grouping of one or more data objects that are connected via edges, and being associated with a respective identifier identifying the respective graph;

computer-executable instructions that, when executed by the computing system, cause the computing system to, for respective data objects of the plurality of data objects, determine a last data change for the respective data object based on the timestamps;

computer-executable instructions that, when executed by the computing system, cause the computing system to, for a first data object of the plurality of data objects, determine that a last data change for the first data object comprises a deletion operation;

computer-executable instructions that, when executed by the computing system, cause the computing system to identify a first graph of the plurality of networks that comprises the first data object;

computer-executable instructions that, when executed by the computing system, cause the computing system to remove the first data object from the first graph;

computer-executable instructions that, when executed by the computing system, cause the computing system to, for at least one edge in the first graph connecting the first data object to a second data object of the first graph, remove contributions of the first data object to the at least one edge;

computer-executable instructions that, when executed by the computing system, cause the computing system to, for a third data object of the one or more data objects, determine that a last data change for the third data object comprises an addition operation for the third data object;

computer-executable instructions that, when executed by the computing system, cause the computing system to add (1) at least one edge between the third data object and at least a fourth data object of the first graph, or (2) at least a fifth data object to the plurality of data objects;

computer-executable instructions that, when executed by the computing system, cause the computing system to determine updated disconnected groupings of data objects;

computer-executable instructions that, when executed by the computing system, cause the computing system to, based at least in part on the updated disconnected groupings of data objects, associate one or more of the data objects for which a last data changed was determined based on the timestamps with an identifier identifying a graph, wherein the updated identifier identifies the respective graph or another graph; and computer-executable instructions that, when executed by the computing system, cause the computing system to store a set of updated graphs based at least in part on the associating one or more of the data objects with their respective updated identifiers, wherein performing read or write operations on data objects of an updated set of disconnected graphs corresponding to the updated disconnected groupings is carried out with improved processing efficiency.

* * * * *